(12) United States Patent
Roberts et al.

(10) Patent No.: US 7,783,697 B2
(45) Date of Patent: *Aug. 24, 2010

(54) METHOD AND APPARATUS CREATING NETWORK SERVICES

(75) Inventors: Andrew F. Roberts, Melrose, MA (US); Jonathan P. Booth, Portsmouth, NH (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/235,937

(22) Filed: Sep. 23, 2008

(65) Prior Publication Data

US 2009/0019359 A1 Jan. 15, 2009

Related U.S. Application Data

(63) Continuation of application No. 10/351,054, filed on Jan. 24, 2003, now Pat. No. 7,447,733, which is a continuation of application No. 09/329,677, filed on Jun. 10, 1999, now Pat. No. 6,560,633.

(51) Int. Cl.
*G06F 15/16* (2006.01)
*G06F 15/167* (2006.01)

(52) U.S. Cl. ............... 709/202; 709/201; 709/217; 715/236; 715/239

(58) Field of Classification Search ......... 709/201–202; 707/2, 501.1, 513
See application file for complete search history.

(56) References Cited

U.S. PATENT DOCUMENTS

| | | | |
|---|---|---|---|
| 6,560,633 B1 * | 5/2003 | Roberts et al. | 709/202 |
| 6,725,425 B1 * | 4/2004 | Rajan et al. | 715/205 |
| 7,028,312 B1 * | 4/2006 | Merrick et al. | 719/330 |
| 7,447,733 B2 * | 11/2008 | Roberts et al. | 709/202 |
| 2008/0229217 A1 * | 9/2008 | Kembel et al. | 715/760 |
| 2010/0005025 A1 * | 1/2010 | Kumar et al. | 705/40 |
| 2010/0049603 A1 * | 2/2010 | Peterson et al. | 705/14.45 |

* cited by examiner

*Primary Examiner*—Bunjob Jaroenchonwanit
(74) *Attorney, Agent, or Firm*—Holland & Knight LLP; Brian J Colandreo, Esq.; V. Raman Bharatula

(57) ABSTRACT

As supposed to the common hard coding method, the invention provides the ability to create a module/mechanism (a template) that produces code that may be utilized to create a web service. A template has a list of features, and a model (a run time model—RTM) and is utilized to create a model that generates an application or web service. An RTM declares the structure, functionality, and behavior of a web service application. Each feature can generate XML entities in a new RTM, and may obtain input to build an XML entity in a new RTM. Each feature may be processed sequentially and can modify any existing XML entities. Consequently, features can make changes to the entire existing application. In one embodiment, when a condition that may affect an application changes, the template may be utilized to regenerate the RTM to produce a new web service or XML document.

11 Claims, 18 Drawing Sheets

METHOD AND APPARATUS CREATING NETWORK SERVICES

CROSS-REFERENCE TO RELATED APPLICATIONS

The present application is a continuation application of U.S. patent application Ser. No. 10/351,054, filed 24 Jan. 2003, which is a continuation application of U.S. patent application Ser. No. 09/329,677, filed 10 Jun. 1999, the entire disclosure of both applications being incorporated herein by reference.

BACKGROUND OF THE INVENTION

1. Field of the Invention

This invention relates to the field of creating network services.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

2. Background Art

The World Wide Web is a collection of web sites that each provide information, data, and/or services of one kind or another. A problem with current Internet and Web services is that each service must be programmed statically and independently from other services. Further, to modify or change a capability of the web service, a programmer must modify the web service's code. This problem can be better understood by reviewing business and their use of the internet.

A large number of businesses rely on other businesses as part of their functionality. For example, a distributor of products relies on all of the different manufacturers of the products to reliably supply not only the products themselves, but information about the price and availability of the products. Manufacturers themselves also rely on parts suppliers to build complete products. To compete in a competitive business environment, it is necessary for companies to be able to provide rapid responses to customers about products and services. This often requires interaction with many other companies. In the past, a customer might have been willing to wait while a company representative made phone calls or referenced catalogs to provide answers to customer requests. But today, customers demand faster service, or the ability to obtain information themselves. In other cases, customers may not be interacting with a company representative at all, but with a company web site. In that environment, the customer requires even more rapid and efficient service.

One way for companies to stay competitive in today's business environment is to develop application programs (software) that allows them ID to interact with third party company computer systems to obtain information and services that are needed to operate the companies business. Traditionally, however, it has been difficult to create these applications. One problem is the difficulty in interfacing with the often proprietary computer systems of different companies. Another problem is the difficulty in writing and debugging the applications themselves, as well as updating them when conditions change or when third party companies change or update their own systems.

This change in business climate has also been driven in part by the internet. The internet has made information from multiple sources easily available to individuals. In addition, the internet has changed the way companies interact with each other. Business to Business interaction is now often accomplished via the internet. Often the relationship between businesses (such as between a distributor and its suppliers) is called a "channel relationship", or a "business channel".

Creating software applications to manage business channels is complex and inflexible using traditional techniques. If a hard coded application is created, it may not be able to respond to new channels that are created or modified over time. Repeated recoding efforts may be required. In other cases, a company may be in a channel relationship with another company without the other company realizing it. For example, companies that use Federal Express or other shippers to transport goods do so without explicit formal relationships with the shipper. For the shipper, maintaining business channels with every company that uses it is a daunting, if not impossible task.

Traditional techniques focus on efficiency in the design of an application in the re-use of code, through object oriented programming for example, but do not provide efficiency or customizability at runtime of an application. With millions of companies making services available on the internet, there is a need to be able to efficiently create custom applications that dynamically invoke and interconnect a combination of web services, and configure themselves in customized formats at runtime. To date, the prior art has not provided effective solutions.

Currently the web is used to provide predefined web pages for viewing by a user/client. But there is a need to do more than provide static web pages. It is desirable to easily create a mechanism/module that will modify or create a web page dynamically while taking into consideration the other elements or components of the web page. Further, there is a growing need to utilize web services that provide users with a variety of capabilities. There are currently no mechanisms for dynamically generating or modifying a web service. Additionally, there is no mechanism to modify a web service based on existing aspects of the web service.

SUMMARY OF THE INVENTION

The present invention provides a method and apparatus for creating network services. Instead of programming or hand coding an entire web service, one or more embodiments of the invention provide the ability to easily create a module/mechanism (referred to as a template) that produces code (referred to as a runtime model) that provides the XML definitions of a web service application. Thus, a template is formed and utilized to create a model that can generate the foundation of a web service application.

Each template is comprised of a list of features, and a model (referred to as a run time model or RTM). An RTM is an XML document that declares the structure, functionality, and behavior of a web service application (referred to as a WSA). In one or more embodiments, each feature is responsible for generating XML entities to be output in a new RTM. Each feature may obtain one or more users' input that is utilized to build an XML entity in a new RTM. Further, each feature may be processed sequentially and has the ability to modify any existing XML entities that have already been created (by other features, for example) in an RTM. Consequently, features have the ability to look at an application as a whole to effect a change to the entire existing application instead of merely adjusting and modifying the entity they are responsible for.

In one or more embodiments of the invention, when a condition that may affect an application changes, the template may be utilized to regenerate the RTM to produce a new web service or XML document.

DETAILED DESCRIPTION OF THE INVENTION

Figure 1:
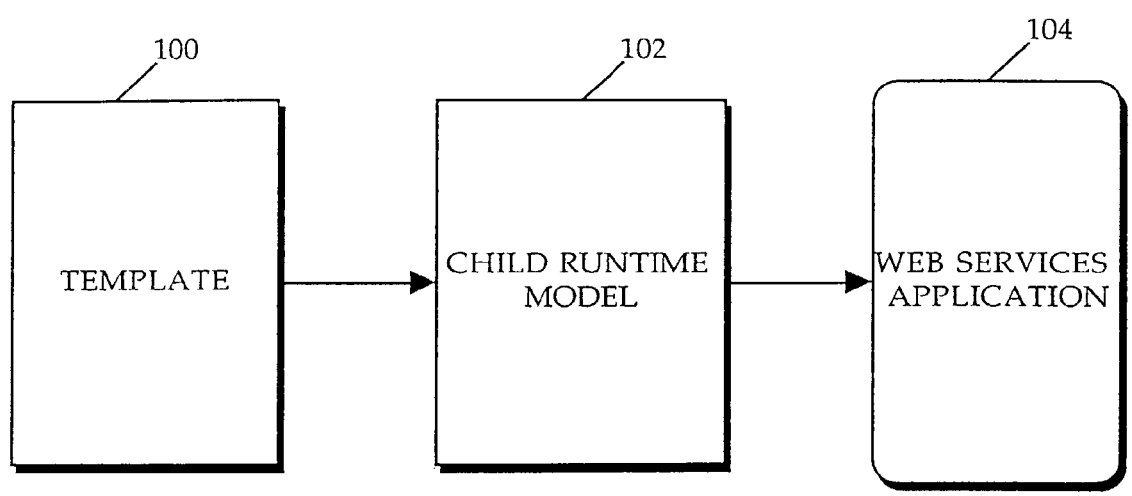
FIG. 1 illustrates the use of a template to produce a WSA in accordance with one or more embodiments of the invention.

In the following description, numerous specific details are set forth in order to provide a more thorough understanding of the present invention. It will be apparent, however, to one skilled in the art, that the present invention may be practiced without these specific details. In other instances, well-known features have not been described in detail in order not to unnecessarily obscure the present invention.

The present invention provides a method and apparatus for creating applications that use available web services. Millions of services are being made available via the internet as well as through existing API's and other techniques. In the internet, many services are being made available as XML services. XML (extensible markup language) is a language used to describe information, or more accurately, to make information self describing. Traditionally, web pages are built using HTML. HTML (hypertext markup language) describes the geometry and appearance of a page of data, in effect creating holes or slots in which data is inserted. However, there is no direct communication of the data that appears on the page in the HTML description. A user might be presented with a page that includes recognizable information, such as name, address, and phone number. But to HTML, the data is simply text to display.

XML, on the other hand, provides a protocol where the type of data being used can be identified. XML can do this in part using predefined "schemas" that can be used to understand the type of data being transmitted. If a standard schema is used, the data need only include a reference to the schema, which need not travel with the data. If a custom schema is used, it can be sent before or after the data, or explicit directions to the location of the schema can be provided.

The present invention can take full advantage of XML based services, but is also applicable for use with any service for which communication protocols can be established.

One or more embodiments of the invention create a web services directory for a business or enterprise that contains available services for use. Interfaces are available for each service to convert requests and responses into appropriate formats for use in internet and back end system environments. Additionally, the interfaces may be utilized to define the schema of request data passed into a called service, and for defining the schema of response data passed out by a called service.

The web services architecture (referred to as the "system") maintains metadata about web services that have been published for use by web service consumers. The system provides access control, organization, interface definition, management, and operation of web services. The web services architecture serves as a centralized location from which web service consumers can gain all information about a set of published web services. In addition, the web services architecture provides a central location from which web services can be run, despite the fact that the systems (applications) that perform the actual work of the individual web services are distributed throughout the Internet.

The web services architecture is comprised of the web services directory and the web services engine. The web services directory is the database, while the web services engine is the processor that handles web service requests.

Web Services Applications and Runtime Models

One of the most significant activities that a web services engine performs is the execution of multiple web services in the context of a single session. The web services architecture supports a type of XML object called a runtime model, which defines the context in which multiple web services are to be executed. When a web services engine receives a request to run the model runner service with such a specified runtime model, the system generates something called a web services application in the session.

A runtime model is significantly different than a declaration of how to chain together the execution of a number of web services. One or more embodiments of the invention provide a runtime model that declares multiple actions, each of which can be bound to the execution of elaborate functionality defined in functions. In addition, a runtime model declares multiple parameters which are used as web service inputs and outputs. And finally, a runtime model draws on the use of a number of web services that construct special user interface pages as output data. The behavior of these pages is to generate subsequent web service requests to the web services engine, and to call for the execution the actions defined in a web services application session. As such, a runtime model, and the web services application it generates, is the recipe for a complex new form of application.

Without WSA's, the web services architecture would be atomic, meaning that, in some instances, the only activity during the processing of a request to the web services engine would be the execution of a single web service. WSA's provide a means to enable the web services engine to perform complex tasks involving many web services. In addition, WSA's enable web service requesters outside the web services engine to interact with a singe session state, across requests.

Operation of Web Services Applications

When a request to the web services engine involves a WSA, the system processes the request, and generates a response. The response can be in XML, HTML, MIME encoded (e.g., a .gif file), or any format supported by Internet wire protocols. In one or more embodiments, a web service request generates a response that takes the form of a graphical user interface to be displayed in a browser. This is the case when the requester (web service consumer) is a web browser. The returned user interfaces often have embedded controls in them that react to subsequent user generated events, and cause the browser to generate subsequent HTTP requests back to the web services engine. These requests are often targeted at the same WSA. In the web services architecture, it is possible for a single WSA session on the web services engine to maintain its state throughout a number of interactions with different requests, generated by different user interfaces. For example, it is possible for a WSA to generate an initial page of UI as the response to an initial request. This UI could contain a button. When the user presses the button, the browser generates a new request targeted against the same WSA. The web services engine invokes a service that enables the existing WSA to process the request, and generate another UI page.

The web services engine manages the caching of WSA's. The web services directory manages the persistent descriptions of web services, and of templates used to build runtime models. The web services engine implements the invocation of WSA's through the use a model runner web service.

The web services architecture maintains a web service for one or more runtime models. When a requestor wants to run a WSA, he generates an HTTP request to run a special type of web service called a "model-based" web service. These web services have the responsibility of maintaining the runtime models for corresponding to WSA's. These web services also reference a common web service driver called the model runner, which is responsible for taking the runtime model as a service parameter, and generating a WSA.

Once the web services engine has invoked an instance of the model runner driver, and has generated the WSA, the model runner driver calls a specific named action (called Onload in this implementation) defined in the WSA. An action is a call to a web service, or a function (which defines the invocation of a number of actions). An action is analogous to an operation performed by a method (e.g., a call to another method/function or performing simple data manipulation like an assignment or concatenation).

The Onload function establishes the initial state of the WSA, and it performs the unit of work that generates the response data to the web services request. When the Onload function has finished running, the model runner driver saves the state of the WSA in the requestor's session. Additionally, the runtime model may also be saved in the requestor's session.

The Page action is a special type of action used to generate response data in the form of an interactive UI. A Page action generates a packet of response data in either HTML or XML, that contains graphically presentable information along with user interface (UI) controls. The behavior of these controls can be set to generate subsequent Web service requests to the web services engine, using the handle or the original WSA session.

Sometimes, a WSA does all its work in the Onload function, sends back its response data, and terminates without any intention of subsequent web service requests establishing downstream contact. Other times, an action (or function) in a WSA generates response data that contains an embedded XML model session handle. This data enables a browser, or other system to generate web service requests against the same WSA session.

Functionality of Web Service Applications

The functionality of a WSA is entirely defined by XML-based declarations in the runtime model, and the functionality provided by the invoked web services. The runtime model that declares the functionality of the WSA, is used by the Model Runner Service to instantiate all of the involved web services invoked by the WSA. In addition, the runtime model contains declarations of logic (functionality), data structure, and behavior.

The behavior of a WSA is defined by a set of bindings of actions to events that are declared in the runtime model. Many of the events are those that would be generated by a user interacting with Pages defined in the runtime model. As web services interact with a SA, the WSA generates Pages as response data, and these Pages contain the behavior defining bindings of events to actions that call additional web services.

In accordance with one or more embodiments of the invention, upon startup, a WSA executes its Onload functionality. During execution, the model runner service driver makes internal calls to additional web services, which results in the web services engine engaging additional service drivers. An internal request to run a web service comes from the web services engine with a set of service inputs that are present in the WSA session. However, external calls come in the form of an HTTP post or get, to a URL in a web services engine, with a packet of input data.

Once the initial web service request has been processed, and the response data has been sent back, the web services engine can handle subsequent web service requests targeted at the model session of the already running WSA. These session specific requests each contain a model handle ID that enables the web services engine to engage a specified WSA. These requests also identify an action to execute in the WSA to perform the work of the web service request. For example, a WSA could have initially obtained a list of employees through its Onload activity, and sent this information in a page, as a response, down to the browser. In addition, this page could contain a button. When this button is pressed, the browser generates a web service request to run a specified action in the same WSA session. This time the request contains the ID of the WSA session. As a result, the button generates a request to run an action in the running WSA, to obtain additional information on an employee whose status is already present in the WSA.

A WSA's state is represented by a set of XML parameters (including web service call data outputs). Parameters are XML containers for data, and they have XML schemas that define the type of data that is supported in the parameters. The data in parameters changes over time in the WSA session. By way of logic defined in functions, a WSA can assign parameter values to service call inputs, as well as direct the outputs of web service calls to parameters. A WSA serves as a brokering system for moving information into and out of web service calls managed by the web services engine.

Finally, a WSA supports the generation and update of fully interactive user interfaces. The user interface is comprised of a set of dynamically generated and updated XML entities called Pages. A Pages is a block of XML data (HTML being a subset), suitable for display by a browser (but in no way limited to view in a browser. A Page doesn't have to contain HTML)

User interface is an optional property of a WSA. Some WSA's have functionality that performs computation on data inputs, and generates output data containing no UI components. These WSA's typically shut down after execution of the initial web service request. Other WSA's have startup functionality that generates UI in the response data. This generated UI can contain tagged behavior that causes the browser to generate subsequent service requests to the web services engine to connect to the running WSA, and invoke additional actions. In turn, these actions can result in the generation of a new or updated page that gets sent back as a response to the service request. Through this interaction, a WSA is capable of handling a complex interaction with A user, while at the same time performing web service call actions that engage web services that are distributed throughout the Internet.

Structure of Runtime Models

A runtime model is a type of document that represents any XML data (including a web service written in XML). For example, in one or more embodiments, a runtime model is an XML document that declares the structure, functionality, and behavior of a WSA. In another embodiment, a runtime model represents 3D geometric data entities, or XSL (eXtensible Stylesheet Language entities), for example. In one or more embodiments, the model runner driver in the web services engine interprets the content of a runtime model in order to produce a WSA. However, other types of services may handle interpretation of runtime model entities used for new applications. One or more embodiments provide for runtime models to follow a schema that is open and extensible.

Runtime models support a wide array of entities that describe different aspects of WSA's. Runtime models can declare functionality that results in multiple runtime models being invoked into WSA's that collaborate during runtime execution. This is accomplished by having runtime models declare calls to web services, that, in turn, make references to other runtime models.

Models

In one or more embodiments, the runtime model may have a root node called a Model. The Model entity contains a set of sub-nodes. In the current implementation, this includes Pages, ServiceCalls, Triggers, Parameters, and Behaviors. As referenced hereinafter, the functionality and use of XML is based on that commonly utilized. Further, the XML descriptions utilized herein are for descriptive purposes and the XML data may be comprised of empty tags. Empty tags are formatted as <tagname/>. XML data may contain filled tags in the form of <tag name>data including other <tagged data>moredata</tagged data></tag name>. Additionally, the structure of XML may not be defined in a schema language and a runtime model can contain any XML data, following any XML schema.

For example, the XML below describes one or more embodiments that contains some entities that may be utilized in a runtime model.

```
<?xml version="1.0" ?>
    <Model xmlns:LDS="" xmlns:LDT="" xml:space="preserve">
        <Pages/>
        <ServiceCalls/>
        <Triggers/>
        <Parameters/>
        <Behaviors/>
    </Model>
```

Pages

The Pages entity of a runtime model contains a set of individual page entities. A runtime model can have any number of pages. Pages serve as a vehicle to for both content and UI that is suitably formatted for display in a browser.

Once the model runner service driver has produced a WSA, it executes a block of functionality in the WSA (see the section on service calls and triggers below), that ultimately sends back a response to the requester. Many times, the response is in the form of an page, suitable for display in a browser.

Since a page as just another type of parameterized XML data in the WSA session, a WSA can utilize a page as output to a service request, or as input to another web service. This means that a WSA can send pages as inputs to a variety of web services. For example, a WSA could send a page to an email web service as the content of a message.

A Page entity contains the following entities:

```
<Page>
    <UniqueID/>
    <UserReadableName/>
    <Target/>
    <Contents/>
</Page>
```

The Contents entity in a Page contains any type of HTML, including nested XML. The Content section also contains XML entities that represent placeholders for data and controls.

One of the actions that can be called in a WSA is the Page action. This action invokes web service, that applies a transformation to a set of Page entities in preparation for sending the data as a response to a service request. The Page action causes the system to insert parameter data into the data placeholders declared in the Page entities, and to write callbacks in the Page for any declared behaviors defined in the runtime model for that Page. For example, an LDT:Button entity declares the presence of an HTML button that has a click action which invokes a web service request against an action in the WSA.

Service Calls

The ServiceCalls entity of a runtime model contains a set of individual ServiceCall entities. Service calls are actions, that invoke web services defined in a web services directory. In one or more embodiments, a service call may only identify web services that are located in the same web services directory that is managing the execution of the WSA. In one or more additional embodiments, a web services engine may make web service requests to web services located in another web services directory, on behalf of a WSA that it is running A service call is an action that calls a web service in the web services directory. A service call also provides a WSA resident representation of the input and output data schemas for the named web service, as well as placeholders for the data. And finally, a service call can maintain a definition of the assignment of input values to the web service's inputs. These assigned values can either be constants, or references to values in parameters in the runtime model.

A ServiceCall entity contains the following:

```
<ServiceCall>
    <UniqueID/>
    <UserReadableName/>
    <ServiceID>cn=xml_file_service,ou=System
        Services,ou=Bow Street
        Services,o=BowStreet,c=US</ServiceID>
    <InputDefinitions/>
</ServiceCall>
```

The InputDefinitions entity contains a set of individual DataDefinition entities. These entities contain assignments of constant values to the inputs, as well as assignments of parameters in the runtime model as sources of data for the inputs to the service call.

In one or more embodiments, effectivity selection criteria may be included as part of the ServiceID information. In one or more embodiments, a service call identifies a service by its name. Further, in one or more embodiments, ServiceIDs may utilize a unique identifier instead of an LDAP distinguished name. In such an embodiment, a template can easily be moved from one directory to another. In another embodiment, a service call may identify attribute values for attributes such as "release level" as a means of identifying the correct version of a service. Further, a service call may identify the version of a service by a selection criteria.

Triggers (Also Known as Functions)

The Triggers entity of a runtime model contains a set of Action entities. Triggers are the equivalent of methods in a class, and functions in a scripted HTML page.

A trigger is a block of execution logic, with an action that serves as an identifying handle. A runtime model can bind action handles to events, and this is what constitutes the notion of behavior. Behavior in the runtime model is defined to be the binding of actions to events.

In one or more embodiments, a trigger is defined to be a sequence of actions. When the trigger's action is invoked, the system invokes the actions specified by the trigger. In another embodiment, triggers support many forms of logic processing including branching.

A Trigger entity contains the following:

```
<Trigger>
    <UniqueID/>
    <UserReadableName/>
    <Actions/>
</Trigger>
```

The Actions entity contains information that describes logic and flow of actions that are executed when the Trigger is invoked. This may be a simple list of actions.

Actions are the handles to functionality defined in the runtime model. In one or more embodiments, there may be an action associated with each service call, trigger, and page, in the runtime model.

Parameters

The Parameters entity can contain any type and number of XML entities. This means that a parameter can represent any form of data.

A Parameter is a place holder for data, but is also a place holder for the structural representation of the data. In other words, for each parameter, the system maintains an XML entity that defines the allowable content, and structure (i.e. the schema) for data in the parameter.

The structural representation of a parameter can be filled in long before there is data associated with a parameter.

Behaviors

Behavioral entities define the mapping of events to actions. In the current implementation, behavior is only defined in Pages through controls. A control can identify the action associated with one of its events. In the current implementation, these actions can only be web service requests back into the web services engine.

Templates

In one or more embodiments, runtime models are hard coded and programmed individually. However, it is difficult to code and maintain such runtime models due to the constantly changing nature of the web services involved (that may be called as part of the runtime model) and the high amount of variability that is required among the runtime models for different uses. As a result, one or more embodiments of the invention provide a system that records instructions for building runtime models. These instructions are called features, and they are recorded in objects called templates.

Templates provide a mechanism for easily generating a runtime model that produces or declares the structure, functionality, and behavior of a WSA. Further, templates provide a powerful and versatile model for invoking WSA's instead of simply issuing a web service request for an explicit hard coded runtime model-based service. Templates provide the ability to dynamically generate a runtime model instead of hard coding a runtime model.

In one or more embodiments, templates are a special type of runtime model (written using high level instructions) that provide for the dynamic construction of a child runtime model (by executing the runtime model represented by the template. Similar to the runtime models discussed above, the child runtime model represents the underlying structure of a WSA and may be turned into a WSA. However, templates and features could be implemented in a different format altogether, not as runtime models. For example, in one or more embodiments, a web service may retrieve the content of a template as a block of data from a relational database. Thus, a template is an intermediate object that provides for the use of a set of high level instructions for building a runtime model.

As described above, a run time model has parameters that are utilized as a place holder for data or the structural representation of data. One of the parameters of a template is a runtime model (referred to as a child or nested runtime model). So, a template is a runtime model that, when transformed into a WSA and run, produces another runtime model inside it, which it may execute.

FIG. 1 illustrates the use of a template to produce a WSA. In the embodiment of FIG. 1, template 100 is a runtime model. However, template 100 may not be a runtime model, in which case runtime model 102 is not a child of any runtime model but just a runtime model created by template 100. The runtime model represented by template 100 is turned into a WSA and executed. The output of the WSA is child runtime model 102. Child runtime model 102 represents and may be used to produce web services application 104. Thus, templates automate the construction of runtime models.

As described above, the parameter section of a runtime model may support various types of XML data. Consequently, one or more embodiments of the invention nest child runtime model 102, as a sort of "work bench", inside the parameters section. Furthermore, since a runtime model can define a WSA's functionality and behavior, one or more embodiments of the invention use a runtime model (i.e., template 100) to define and construct child runtime model 102 through a series of web service calls to web services known as feature services. Feature services have the property of accepting a reference to a runtime model as input, along with other parameters, and producing a transformed runtime model as output. In another embodiment, child runtime model 102 may be constructed using code referred to as "feature creators" instead of actual services. A feature creator can be embodied as a service (e.g., the feature service) or as a Java class, for example.

As described, template 100 is a runtime model that has a number of special types of data in its parameters section, as well as a number of web service calls that generate nested runtime model 102.

The special types of data in the parameters section of a template may contain the following entities:

```
<Parameters>
    <Features/>
    <Model/>
</Parameters>
```

Figure 2:
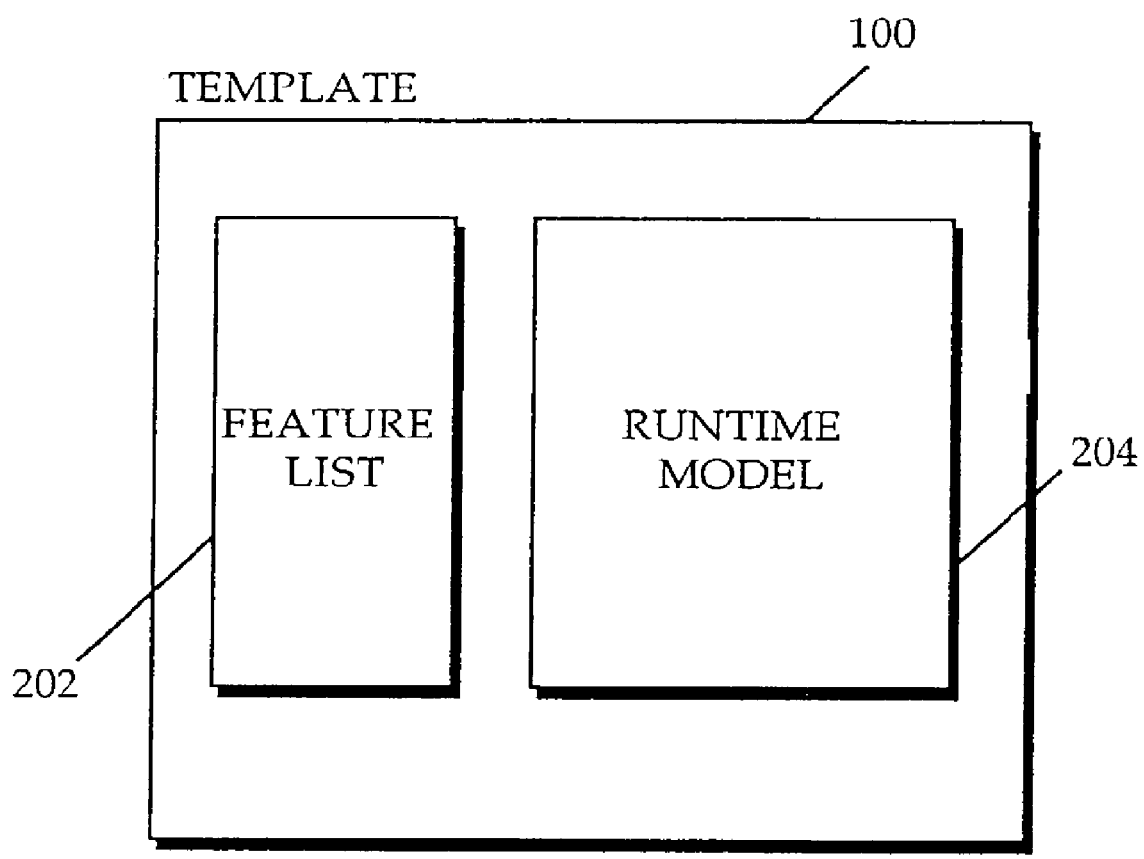
FIG. 2 illustrates the composition (including parameters) of a template in accordance with one or more embodiments of the invention.

FIG. 2 illustrates the composition (including parameters) of template 100. Runtime model 102 is one parameter. The second parameter is that of feature lists 202. The model entity/parameter is a runtime model as described above. Thus, when the template is turned into a WSA, one of the parameters used by the WSA is a runtime model. As will be described below, this runtime model is modified by the WSA until the complete child runtime model 102 is produced. Thus, the child runtime model is produced by modifying the runtime model parameter. The runtime model parameter is modified in accordance with specifications provided by the other parameter entity-features.

Figure 3:
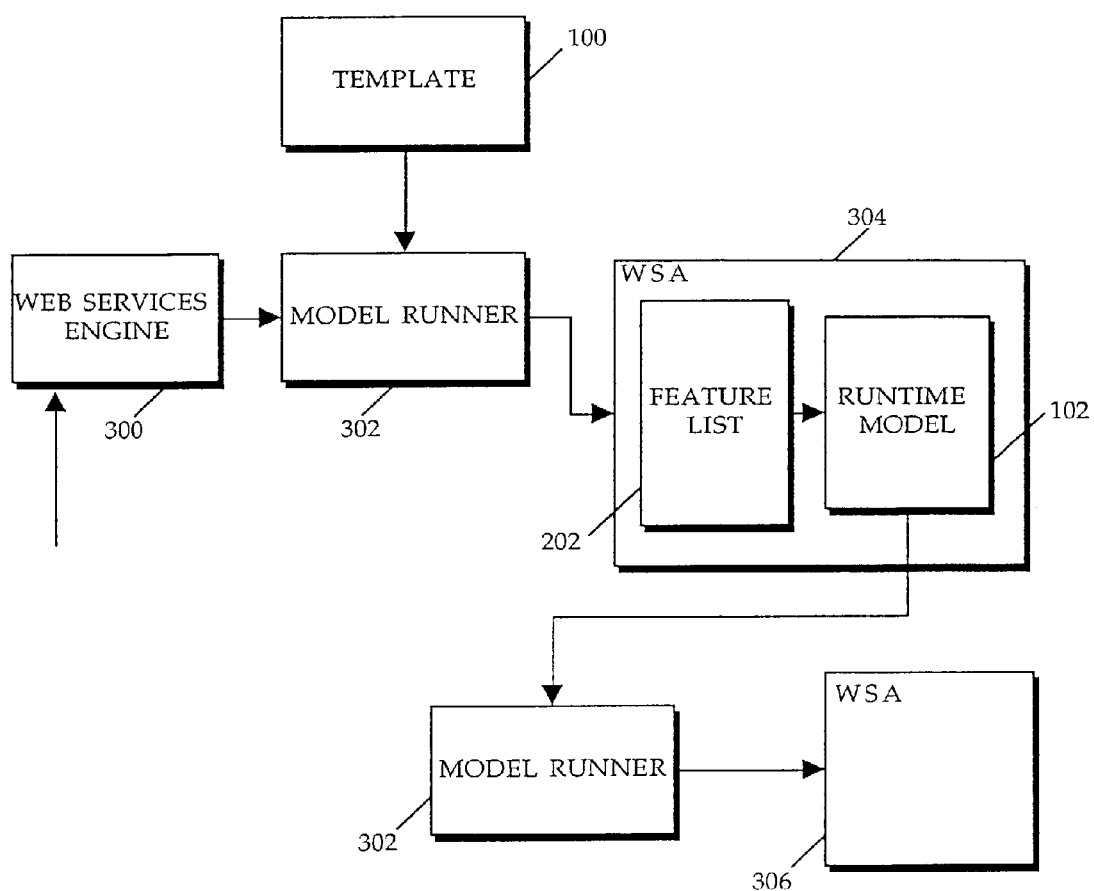
FIG. 3 illustrates the generation of a web services application using templates in accordance with one or more embodiments of the invention.

FIG. 3 illustrates the generation of a web services application using templates. First, web services engine 300 receives a request for a template based service. Web services engine 300 transmits the request to model runner 302. Model runner 302 is configured to load a runtime model and generate a WSA. Thus, model runner 302 loads template 100 and produces the corresponding WSA 304. WSA 304 contains features 202 that are utilized to modify and create child runtime model 102. WSA 304 makes calls to the feature services or feature creators identified by features 202 to generate the child runtime model 102. Model runner 302 is then utilized to load child runtime model 102 and transform it into WSA 306.

Thus, template 100 is utilized to generate runtime model 102 which corresponds to a web services application that may be utilized by the system.

Features

The features entity/parameter of template 100 provides the ability to build or generate entities to produce child runtime model 102. The features entity contains a list of features that comprise what is known as the feature list. The feature list is the instruction set that describes how a web service (known as regenerate) should build the child runtime model, through the use of a set of "side kick" web services (called feature services or feature creators), and a set of input values (referred to as feature input parameters).

Figure 4:
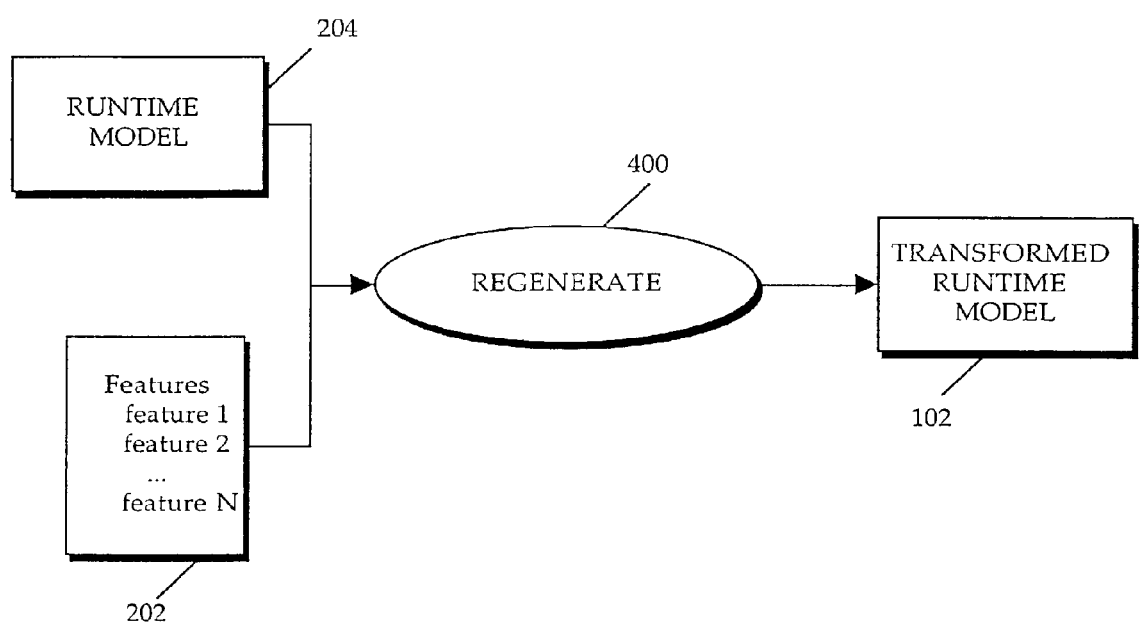
FIG. 4 illustrates the regeneration process in accordance with one or more embodiments of the invention.

The features in feature List 202 utilize runtime model 204 as input and are executed in the order that the features are listed. Each feature may modify or alter the existing runtime model 204 used as input. This execution process is called regeneration. As an alternative to standard programs, the regeneration process may be in the form of a WSA (described in detail below). The regeneration process generates the content of nested runtime model 102, based on the input parameters that are defined for each feature in the feature list. FIG. 4 illustrates the regeneration process in accordance with one or more embodiments of the invention. Regeneration WSA 400 utilizes feature list 202 and runtime model 204 as input to produce transformed runtime model 102.

In one or more embodiments, the regeneration process may be executed immediately upon the creation of a template. By executing the regeneration process at such a time, the runtime model does not need to be generated when the web service is requested to be run. However, in this scenario the completed runtime model must be stored in persistent memory. In other embodiments, the regeneration process is executed dynamically at the time a web service is requested to be run. By executing the regeneration process at such a time, the user can be more adequately assured that any web services that are referenced by features are the most recent versions of the services and that any input/output schema data utilized is the most recent data. However, by dynamically generating the model or WSA, the processing time may be lengthened.

A feature consists of two components: a feature user interface template and a feature service. The feature user interface template is responsible for obtaining input from a user or other application, and for building and subsequently maintaining a feature block in the feature list. The user supplied inputs to a feature user interface template are utilized in the creation of the input parameters for the feature service identified in the feature block. The feature service performs the work of generating entities in runtime model 102 based on the feature parameters. In one or more embodiments, the feature user interface template gets inputs from a user, and then produces a feature block. This block of data is placed in sequence in the feature list. The feature block contains input parameters and the name of a feature service that does the work of building the runtime model entities. In one or more embodiments, the inputs that the user supplies to the feature UI template, may not be the same as what the UI template puts in the feature block. For example, in one feature, the UI template takes inputs from the user about the name of a relational database table and columns to query, and then writes these as SQL (structured query language) data inputs in the feature block. So, a feature UT template can perform a transform on the inputs before placing them in the feature block. If a user modifies a feature, the feature UI template also performs the reverse mapping to take the feature block inputs, and map them back into the UT for the user to modify.

Figure 5:
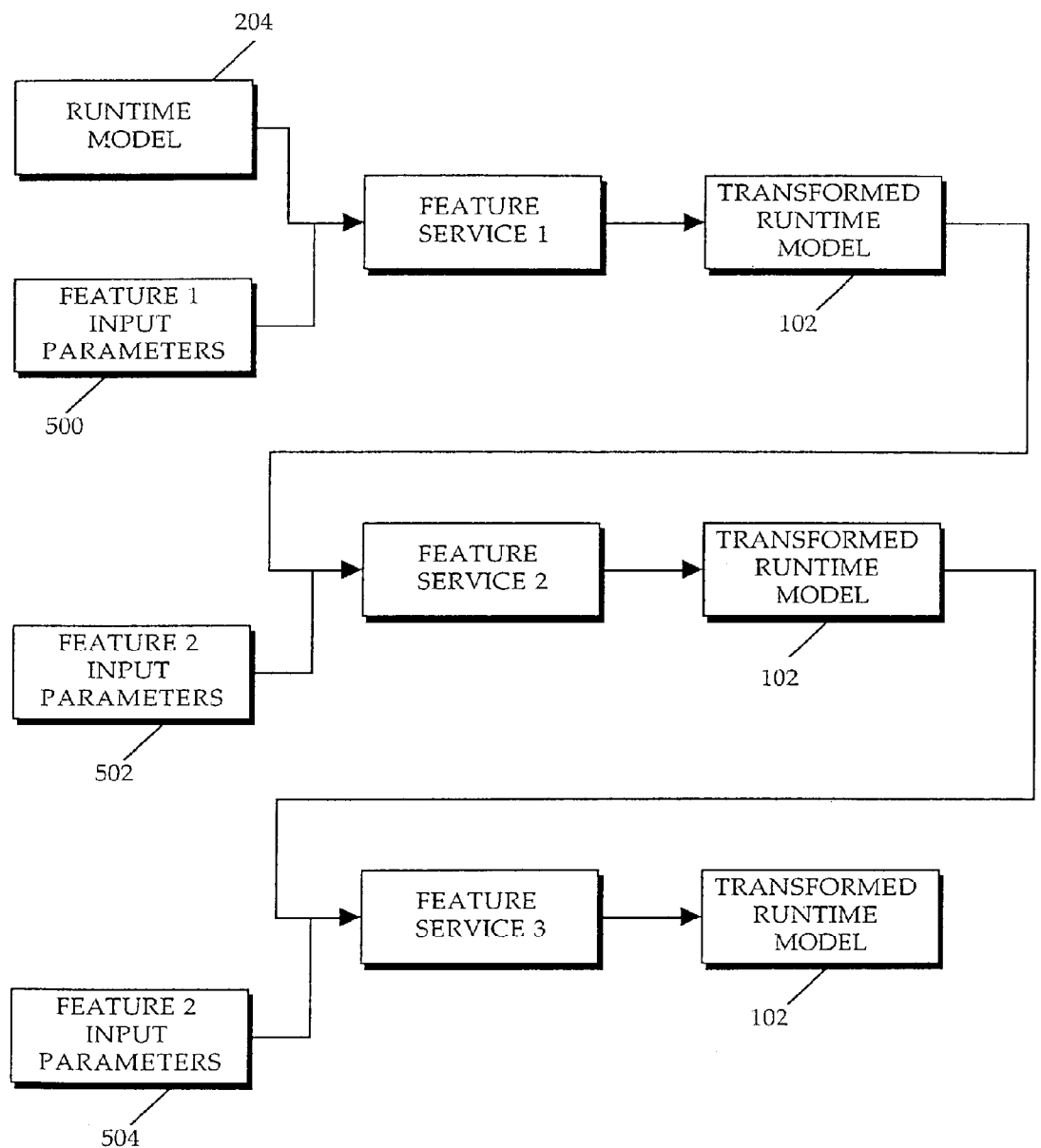
FIG. 5 illustrates the use of features and features services to create a transformed runtime model in accordance with one or more embodiments of the invention.

Each feature in a template is represented by a block of XML data that defines a set of input parameter values for the feature, and the name of the feature service that performs the work of using the feature input values to transform runtime model 204 into runtime model 102. Each feature service effectively takes runtime model 204 in as one of its inputs, and produces transformed runtime model 102 as its output. FIG. 5 illustrates the use of features and features services to create transformed runtime model 102. A feature user interface template for feature 1 may obtain feature 1 input parameters 500. Feature service 1 utilizes feature 1 input parameters 500 and runtime model 204 to produce transformed runtime model 102. Feature service 2 then utilizes transformed runtime model 102 and feature 2 input parameters 502 as input to generate a new transformed runtime model 102. The feature service corresponding to each feature in the feature list processes the transformed runtime model in combination with the feature input parameters to produce a final child runtime model 102.

Since the feature services are executed sequentially, each feature service may modify the transformed runtime model as a whole as desired. Thus, each feature has the ability to dynamically look at an existing runtime model and modify the model based on the presence, absence, or state of the runtime model. Such an ability provides a significant advantage over typical programming wherein a program is hard coded and only individual units may be modified independent from the existing program. Additionally, a hard coded program can only run. During execution, a hard coded program can only react to the environment as a means of altering its behavior. In templates, the features build the program prior to its running. Thus, the program has another level of adaptation that is infused into the program or synthesized in, prior to it running. Thus, because a feature can modify any aspect of an existing runtime model, one feature can reverse the effects of any prior executed feature, if desired.

An example of a simple feature is an Imported Page feature (that constructs the HTML background content of a Page entity in the runtime model). This feature has a feature input parameter for specifying a URL to the page that serves as the basis, or starting point, for the content of the Imported page. For example, a feature user interface template may request a URL from a user or other service. Once the URL is obtained, the feature user interface template may forward the URL to the feature service for further processing. Alternatively, the feature UI template may write a feature block, which contains data that the regenerate service will ensure gets passed into the feature service. As described above, the page located at the specified URL may be utilized as the input to the feature service that will eventually produce a page for transmission to the end user. The feature also has an input for specifying how many pages should be constructed in the runtime model that uses the imported URL content. Based on the values supplied for its two inputs, the feature service that constructs Imported Pages in the runtime model produces the correct number of page entities in the runtime model, and guarantees that the pages have unique ID's with respect to the other entities that have been constructed in the runtime model (by features prior to the current feature).

In one or more embodiments, one or more features may have a static HTML document as input (as specified by a URL, for example) and the output from the runtime model is a service enabled web page. A service enabled web page may permit an end user/viewer to invoke services by selecting certain portions of the document. For example, if a table is displayed on a web page, a user may be able to select a column with which to sort the item in the table. Such an action may invoke a web service that has the ability to sort information based on the selected input (e.g., the value of the column selected). Alternatively, a user may be able to select a particular row of a table and obtain more detailed information related to that row (e.g., if a row a represents an employee and the employee's salary, clicking on the row may produce more detailed information relating to the employee). To complete a desired action as part of a web service or to service enable a web page, one or more features may need to be utilized. Each feature is comprised of one or more entities.

A feature entity may be comprised of the following entities, for example:

```
<Feature>
    Feature1
    <FeatureServiceID>cn=create_empty_page_service,ou=System
        Services,ou=Bow Street Services,o=BowStreet,c=US
    </FeatureServiceID>
    <FeatureModifyTrigger>ModifyPageUI</FeatureModifyTrigger>
    <FeatureName>Page</FeatureName>
    <FeatureInputs>
        <PageName>inputs page</PageName>
        <FeatureRegenData>
            <UniqueID>Page1</UniqueID>
        </FeatureRegenData>
    </FeatureInputs>
</Feature>
```

The FeatureServiceID entity is the name of the feature service that performs the work of constructing the runtime entities for this feature during the regeneration process.

The FeatureModifyTrigger entity is the name of the template that provides the UI for gathering the input values that are supplied to the Feature Service. This UI is invoked when the user initially creates the feature in the template, as well as whenever the user desires to change some of the input values supplied to a feature.

The FeatureInputs entity contains value assignment information for the feature's input parameters. This information can be supplied in the form of constant values, or references to the values of other parameters in the runtime model.

In one or more embodiments, a feature is just a block of metadata in a template that identifies a feature service, and a set of input parameters that enable the feature service to construct entities in the runtime model.

Alternatively, in one or more embodiments, a feature entity may be comprised of the following entities, for example:

```
<Feature>
    Feature3
    <IsEnabled>true</IsEnabled>
    <FeatureClassname>
        com.bowstreet.services.PageFeatureCreator
    </FeatureClassname>
    <FeatureName>ImportedPage</FeatureName>
    <FeatureModifyTrigger>InvokeFeatureTemplate
    </FeatureModifyTrigger>
    <FeatureModifyTemplate>ImportedPageFeature
    </FeatureModifyTemplate>
    <FeatureInputs>
        <URL ID="0">demo1.html</URL>
        <PageName ID="1">Main page</PageName>
    </FeatureInputs>
</Feature>
```

The FeatureClassname entity is the name of the feature creator that performs the work of constructing the runtime entities for this feature during the regeneration process.

The FeatureModifyTemplate entity is the name of the template that provides the UI for gathering the input values that are supplied to the feature creator. This UI is invoked when the user initially creates the feature in the template, as well as whenever the user desires to change some of the input values supplied to a feature.

Feature Selection

Users may select features for creation in a template by using a template author application. In one or more embodiments, a template author application may allow a user to merely select a desired feature (e.g., by clicking a mouse button while the cursor is located over a desired feature) and dragging and dropping the feature into a template. Such an implementation may be provided by a WSA that generates the user interface and drag and drop capabilities. The user interface in such an embodiment may provide the mechanism through which a user supplies feature input parameters that are used to place features in a template. The template author application takes the input values, and writes the feature metadata block in the features section of the template.

Figure 6:
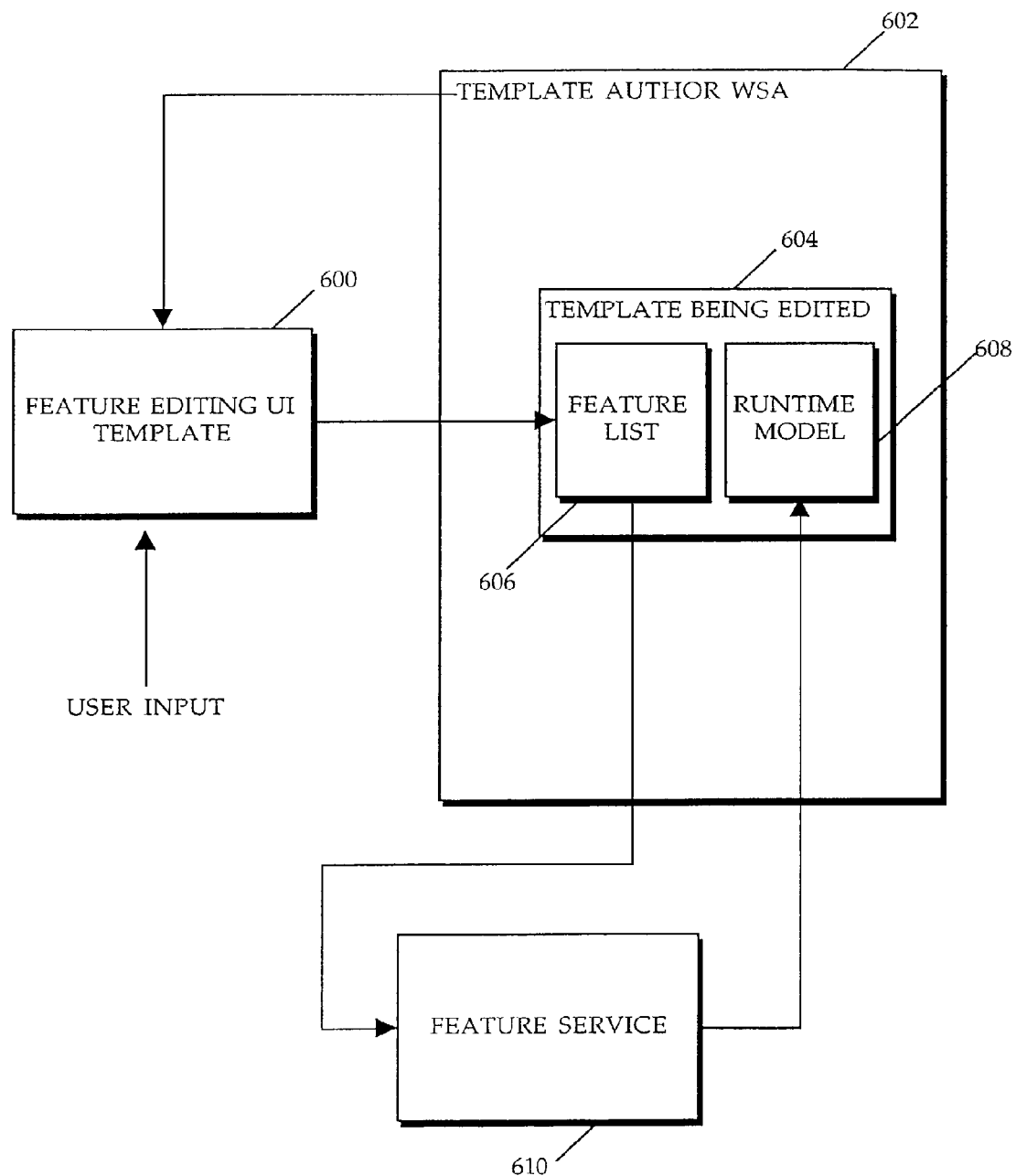
FIG. 6 illustrates the selection of a feature for use in a template in accordance with one or more embodiments of the invention.

FIG. 6 illustrates the selection of a feature for use in a template in accordance with one or more embodiments of the invention. To select a feature for placement in template 604, the user selects a feature from a list of feature types in template author application 602. The system invokes a template based web service designed to generate the applicable UT to interact with the user to get the input values for the specified feature. This UI, known as "Feature Editing" UI 600, is responsible for obtaining values for the feature's input parameters, from the user. These values can be explicit values supplied by the user (like the number "123" or a URL such as "http://www.bowstreet.com"), or they can be user supplied references to entities in the runtime model (like a reference to a parameter "pdq" that contains a number like "123" or a URL).

An example of the use of references is with the Button feature. One of the input parameters to the Button feature is the set of pages to which this button is to be added. The user can reference specific pages by name, or can specify a keyword such as "All". The Button feature constructs the correct number of buttons, on the correct pages, depending upon the value supplied for the feature input parameter.

Once the user has completed supplying values to feature editing UI 600, feature editing UI WSA 600 writes a block of XML data into the template being edited 604, called the feature block. The feature editing UI writes this block of data into the features section 606 of the parameters in the template being edited 604, after the last feature that already exists in template 604.

The way that a user instructs the template author WSA to begin the creation process of a new feature is by making a web service request (clicking on the feature in the template author UI) to run an action in the WSA. This action invokes a template based web service for the specified feature editing UI template 600. This template based service generates its own UI to get inputs from the user, and eventually, calls an action in template author WSA 602 that instructs it of the feature input values, so that the template author WSA can build the feature metadata block.

After the feature UI template and the template author WSA jointly write the feature block, template author WSA 602 invokes the regeneration web service. This web service executes the feature service associated with the feature block that has just been written into the template. (Note: Regeneration is responsible for executing all of the feature services 610 corresponding to the features in feature list 606.) Feature service 610 uses its input parameter values, along with runtime model 608 (which it can analyze and use as a basis for making decisions), to generate a transformed runtime model.

A feature captures one of the process steps that transforms the runtime model. The set of features in a template collaboratively defines the complete sequence of transformations that is needed to transform an empty runtime model into one that is ready for instantiation into a WSA by the web services engine.

One property of features is that they capture and automate the execution of a set of process steps that is normally performed manually by an application developer. Traditional application development tools support an explicit modeling approach that fails to capture the design intent of the developer, as well as the complete process followed in building an application. Traditional tools, including Java and C++ development products, capture data representing the end result of a manual design process (i.e. source code). As such, traditional applications are time consuming to build, and difficult to change. Developers must delete code and create new code to affect change. The developer is responsible for making sure that change is propagated thoroughly. Traditional application editing tools can assist in determining if the application is corrupt, and it can try to reverse engineer the application to diagnose the problem. However, since the recipe followed to build the application is not present, there is no straight forward means of regenerating an application from its recipe.

In accordance with one or more embodiments of the invention, features can be applied towards the construction of any type of XML model, not just runtime models. For example, a set of features may be created for building XML-based messages.

One property of features is the ability to have feature input values that are references to entities in the model. This property allows a feature to not only add entities to the model, but to mark entities as "obsolete" as well. A feature can make very profound transformations to the model to which it is applied.

Feature Regeneration

As described above, the regeneration process create a WSA based on the features as specified in a template. The feature regeneration web service operates on the feature list and the runtime model. Complete regeneration involves rebuilding the runtime model from scratch, whereas partial regeneration involves transforming the runtime model on behalf of only some of the features. For example, one or more embodiments of the invention may provide for the use of some features in one situation and another set of features in another situation (wherein both sets of features are present in the same template).

When the regeneration service executes a feature service, it passes the runtime model into the service so that it can make references to entities in the runtime model. Each feature service has the ability to add entities. One or more embodiments provide for a runtime model to span a single XML document. In other embodiments, feature services build entities in a runtime model that span a whole collection of XML documents.

In one or more embodiments, the regeneration service does not maintain a copy of the old runtime model while it is constructing the new model. However, in other embodiments, the old runtime model is stored so that if the regeneration process fails, the regeneration service can return the original runtime model. Further, a backup copy of the runtime model may enable the ability to compare an old model to the new one as it is being regenerated.

In one or more embodiments, the regeneration service maintains a "forwarding address" list of XML entities that are eliminated from the runtime model during the current regeneration, compared with the past regeneration. If a feature service regenerates and produces different entities than it generated the previous time, then the mapping of the old entities to the new entities is added to a forwarding address list. Subsequent feature services that might reference the eliminated entities can be "rescued" by the regeneration service, which can use the forwarding address list to automatically "bend" the references to the new entities.

One or more embodiments of the invention maintain a mapping of the feature that produced each entity. This allows a number of web services to be more efficient in their dealings with the runtime model. For example, when a user wants to edit a feature in the middle of the feature list, the system can immediately find all entities that were produced by features after the edited feature. The system uses this information to prevent the user from selecting an entity for reference purposes in a feature that was created after it. By preventing this referencing from taking place, the system prevents unnecessary regeneration failures caused by a feature not being able to reference an entity because it hasn't been created yet in the feature regeneration process.

Table Feature

One or more embodiments of the invention provide for the utilization of a variety of features. For example, in accordance with one or more embodiments, a table feature may be utilized.

The table feature creates a table to display XML data in a page. Such a feature may allow the user to bind the table to a named entity in the page. This entity can be an empty tag, or a table that defines the graphical formatting.

In one or more embodiments, the table feature utilizes one or more of the following inputs: what page, what placeholder (named tag in the page), and what XML parameter to display.

The feature builds a table in the page that displays the XML data in row format, with a header of labels for the column names. When the user activates a "page" action on this page, the table data will be displayed in the table, according to any formatting that has been defined in the named tag contents (i.e. formatting of <TD> and <TR> tags).

Active Column Feature

In one or more embodiments, a feature called "active column feature" may be utilized. The active column feature transforms a static display column (e.g., produced by a table feature), into an active column. Thus, the cell contents of the column are under the control of the WSA. The column can contain a button that triggers an action, or can display a link, checkbox, or textfield, etc. The user specifies the control, and the behavior. For example, the user can put a button in the column, and have the click action activate a call to a function that accesses specific table row values in order to make a service call.

In one or more embodiments, the active column feature utilized one or more of the following inputs: what table, what column name (can be a new one by specifying a position), what column entity (button, Clickable link, hidden, checkbox, textfield, etc).

The active column feature transforms a static column into a parameterized, controlled column. The feature can put a control in the column, and map the original contents into some property of the control, like its name. The feature also builds behavior on the column, such as defining the click behavior of a button.

Visibility Control/UI Constraint Feature

One or more embodiments provide for a visibility control feature (also referred to as a UI Constraint feature). The UI Constraint feature builds one or more service calls to a web service that utilizes an inference engine on a server. The inference engine maintains a set of patterns, and manages the process of checking whether or not the user has done anything in the UI to trigger an update to the UI.

Many features in a behavior category would be users of an inference engine. A variety of combination of state changes in the model can be linked to actions that affect everything from visibility of UI controls, to calling of functions.

The features that generate calls to the inference engine based web service take input from the user, and, as part of regeneration, construct rule defining input parameters, that get passed into the inference engine service on model runtime load. These features also add behaviors to the model in the form of update actions bound to events. The actions inform the inference engine of important changes to the model's state. The inference engine service may respond by changing the model's state and calling various actions.

For example, suppose a user had created a drop down list control allowing the user to select one or more of the 50 States. In addition, suppose the user had constructed a checkbox control with the options Yes/No, and the label: Are any of your drivers Mexican?.

Next, the user constructs a UI Constraint feature. The feature asks the user questions about the nature of the constraint. The user indicates that when State=CA, or TX, the Mexican Driver Question checkbox should be visible, other wise not.

This feature takes care of the rest, by building the appropriate entities in the runtime model. The feature builds a call to the "load inference engine" service, and adds the action to the Onload function. The feature writes the syntax of a new rule (State=CA, TX->checkbox visible, otherwise opposite) and appends it to the input to this service. Next, the feature binds a call to the "update inference engine" service, to the "On Value Change" event on the State Dropdown. Now, when the user changes the state value, and tabs out of the control, the browser will inform the inference engine service of the change, so that the inference engine can make any changes to the visibility status of the checkbox, and perform a page action. Consequently, the inference engine would know that the value of State (e.g., when the state has been changed from California or Texas to Minnesota) and would know not to display the question relating to Mexico.

The UI constraint feature can provide control over visibility of individual controls, multiple controls, or things like DIV tags, that control bunches of controls. In addition, this feature can provide control over ranges of allowable values, and lists of values.

XML Transformation Feature

One or more embodiments of the invention provide for a versatile service that performs a transformation of an XML tagged data object, using another tagged data object containing a block of XSL instructions. The service outputs a transformed tagged data object representing the transformed data. The service will wrap a standard XML and XSL processing engine such as the one from IBM called LotusXSL.

In addition, one or more embodiments construct a number of features that, in general, take inputs from the user, including references to tagged data object parameters, and write blocks of XSL, and write calls to the XSL processor service.

As an example, a column filtering feature could ask the user to select a result set, and then ask the user to select a set of columns to filter (include) from the structural representation (schema) of the result set. This feature service writes a service call to the XSL processor service, writes a block of XSL data, in the form of a parameter, as the instructions for the transformation, and writes a function that assigns the XML data as input and the XSL parameter as the transformation logic, and calls the service.

At regeneration, such a feature service dynamically builds the XSL block which is executed at runtime when the XML transformation service is called.

This XSL processor service has the ability to serve as the work horse for a number of features that write XSL blocks, make assignments, and call this service's action. In one or more embodiments, the service can be used by features that wanted to merge two different tagged data objects. Such a feature could "concatenate" two tagged data objects into a single input XML object, and then let the XSL logic perform the merging (inter splicing) of data.

Sample Template

Figure 7A:
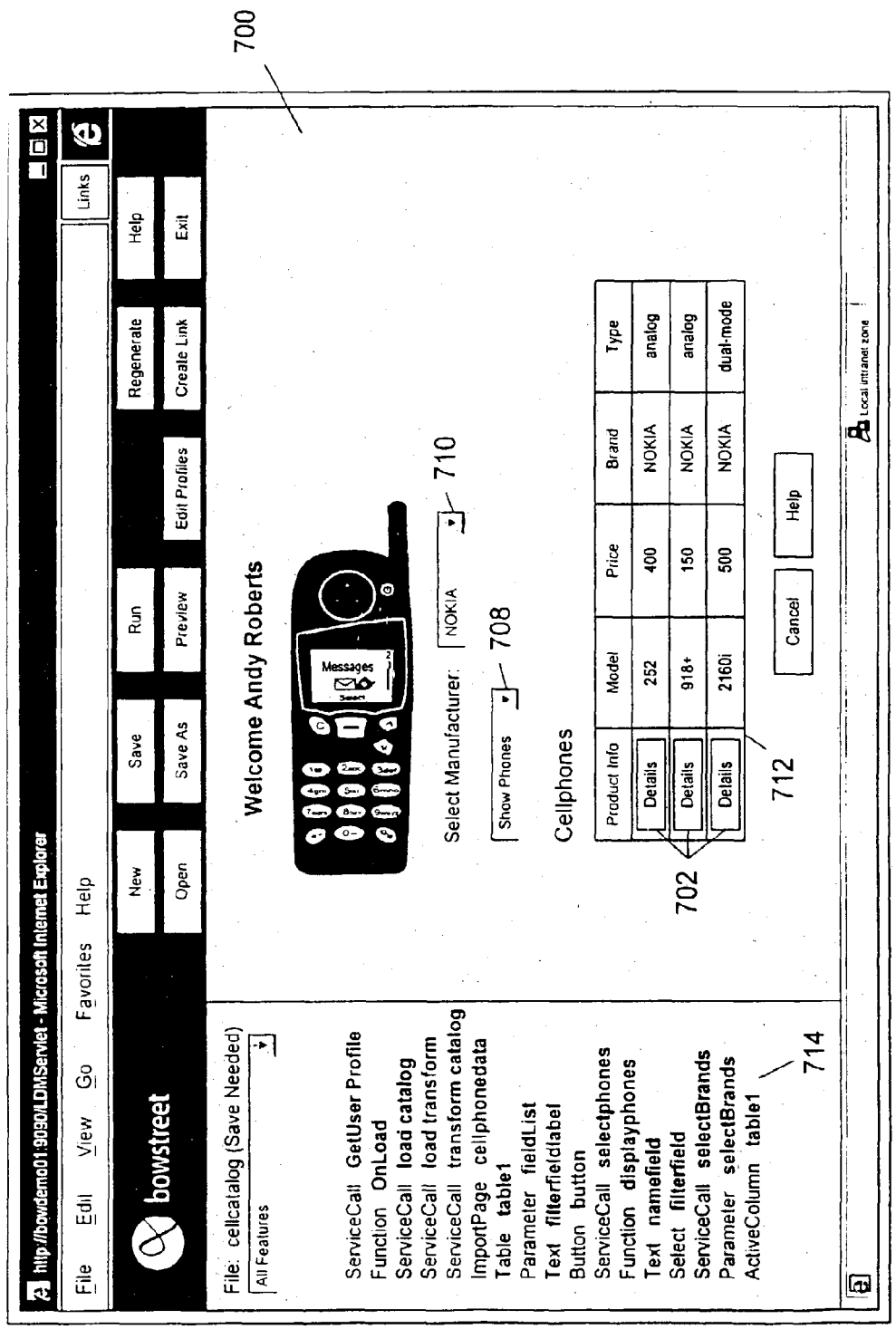
FIG. 7A illustrates a cellular phone system display produced in accordance with one or more embodiments of the invention.
Figure 7B:
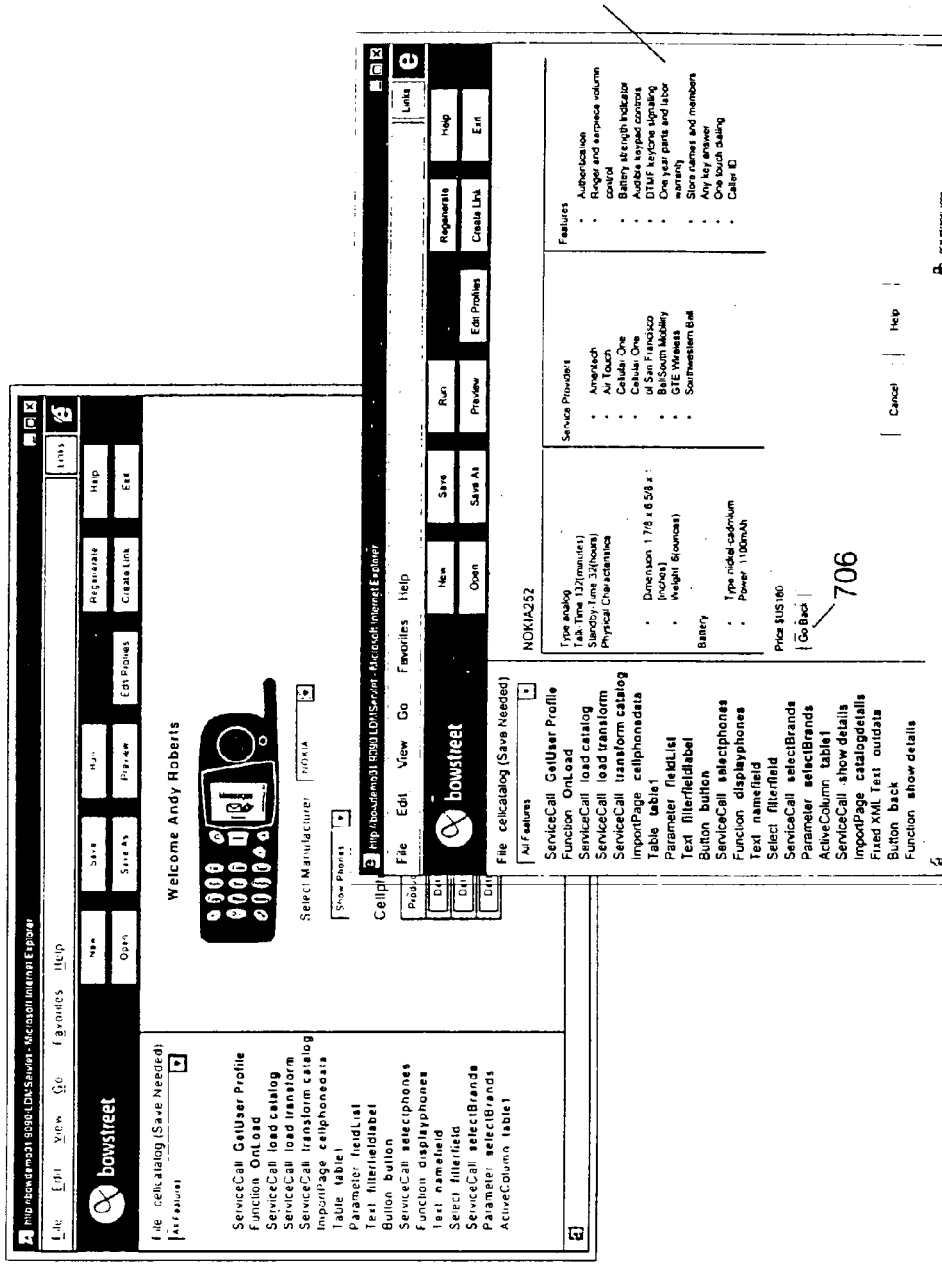
FIG. 7B illustrates the resulting display upon pressing a "details" button of FIG. 7A in accordance with one or more embodiments of the invention.

In accordance with the description above, one or more embodiments of the invention may provide for a cellular phone catalog system. A cellular phone catalog system may be useful for displaying the phones available from a certain manufacturer and by clicking on one of the displayed phones, providing detailed information about the selected phone. For example, a user may be presented with display 700 in FIG. 7A. By selecting one of the "Details" buttons 702, the user may be presented with a detailed description of the phone in the corresponding row as display 704 of FIG. 7B. One or more embodiments of the invention provide the ability to construct the functionality and display the results as illustrated in FIGS. 7A and 7B.

For illustrative purposes, the following description assumes that part of the "cellcatalog" template (the template utilized in accordance with one or more embodiments of the invention) has already been created. For example, it is assumed that the template already has a number of service calls and UI control features that present an XML cell phone catalog in a table on an input page. The base functionality provided in the template includes the ability to open a cell phone XML data source, and transform the data source into a catalog using an XML transformation service. In addition, the functionality includes the ability to extract the cell phone brand name list from the XML data, and presenting the information in drop down list 710 so that the user can select a brand, and filter the cell phone catalog by brand. Thus, the existing template provides for the display of a static HTML page (with the ability to select and display a specific brand of cellular phones) without a product info column containing Details buttons 702.

The goal of the described embodiment is to add an active column of buttons to the table that causes the system to call a product specification service (e.g., to obtain the detailed product description display 704). This service has been published in the web services directory. The service returns detailed product specifications for a product identified by the selected row in the table. When a user presses a Details button 702 in a table row, the WSA calls the service and passes row specific information into the service call, and then presents the output data 704 on a separate page.

Figure 8:
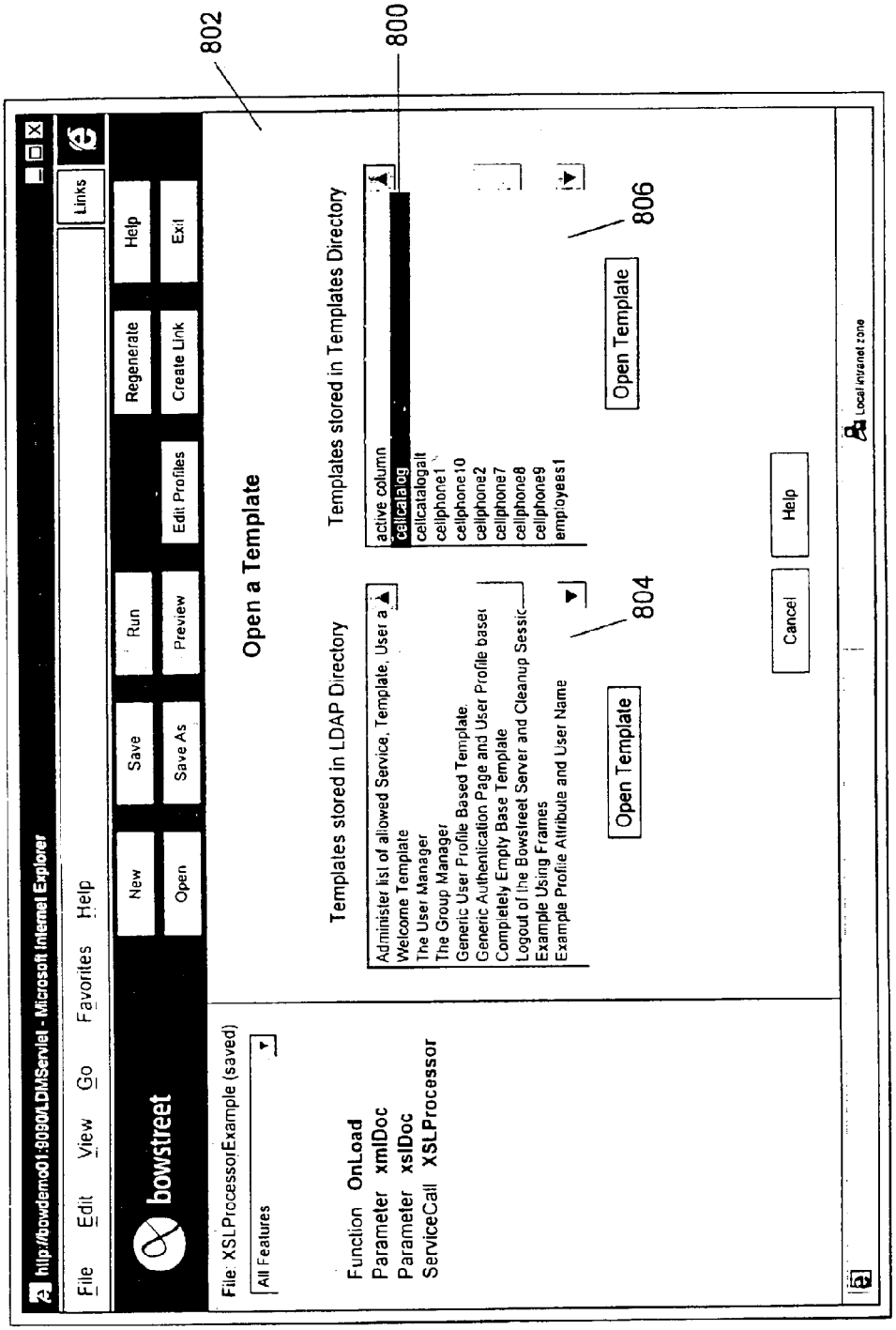
FIG. 8 illustrates the selection of a cellcatalog template from an "Open a Template" screen of a template author application in accordance with one or more embodiments of the invention.

In accordance with one or more embodiments, to edit an existing template, the template is opened using a template author application. FIG. 8 illustrates the selection of the cellcatalog template 800 from the "Open a Template" screen 802 of the template author application.

Figure 9:
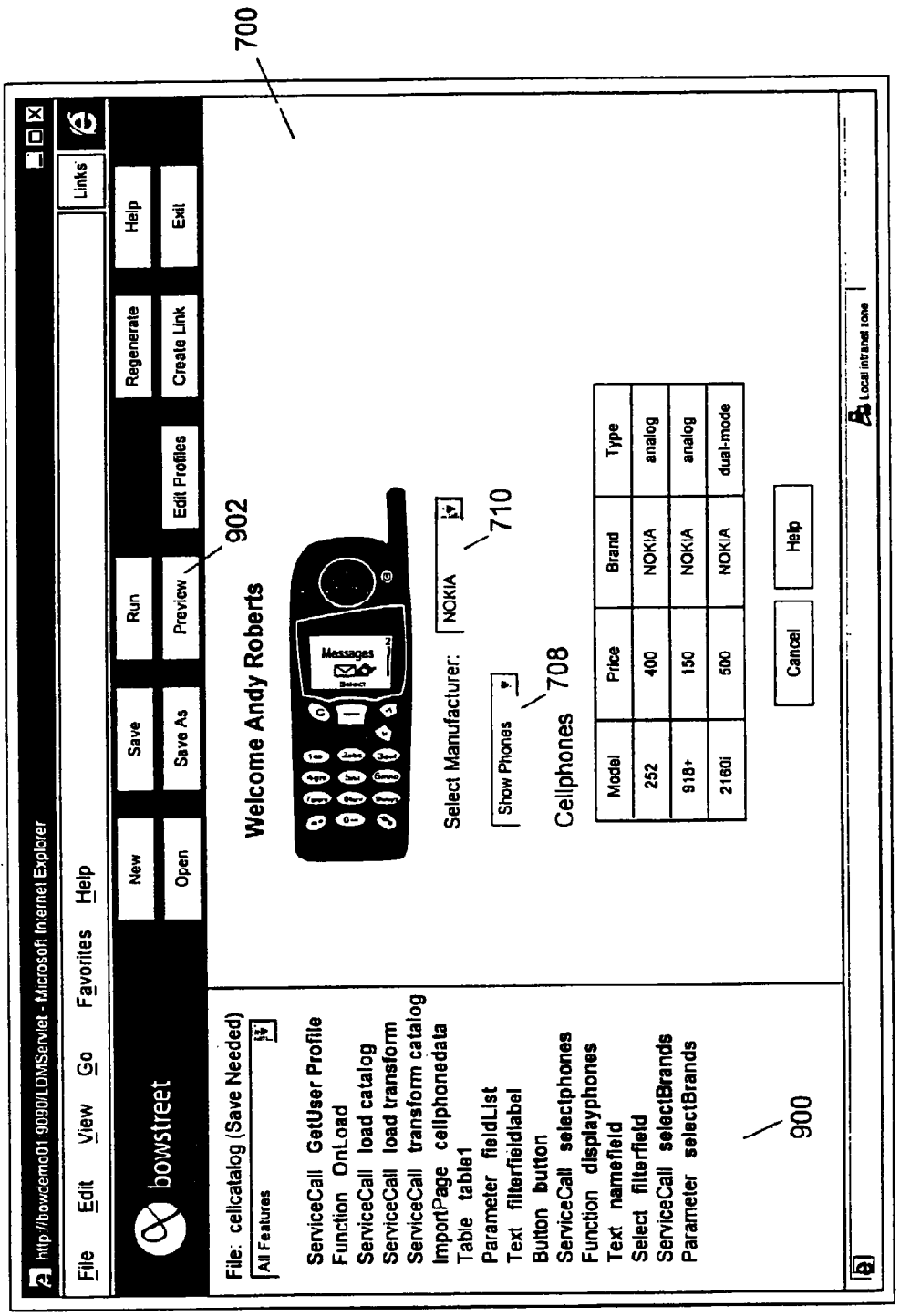
FIG. 9 illustrates the open cellcatalog template in accordance with one or more embodiments of the invention.

FIG. 9 illustrates the open cellcatalog template 800. Display 700 illustrates the current view of the output from the template. Display 900 illustrates the current list of features in cellcatalog template 800.

Preexisting Features

The preexisting features (as displayed in display 900) of template 800 may be constructed in accordance with one or more embodiments of the invention. The first preexisting feature is a service call to a "Get User Profile" service. This service provides a number of XML entities in its service outputs that can be referenced by other features in the template. This includes information about the user's name: dsml: givenname, membership: MemberList/dsml:dn; mail address, etc. . . .

The second preexisting feature is a function that defines the Onload functionality when the runtime model is executed. The feature defines a sequence of service call actions, and a page action at the end that generates the initial page. Other features in the template are responsible for creating the service call actions that this feature references. The sequence is: Get User Profile, Load Transform, Load Catalog, Transform Catalog, selectBrands, selectphones, and perform the page action cellphonedata, which is the start page.

The third and fourth preexisting features are both service calls to an "XML File Reader" service. The third preexisting feature loads an XML catalog from an XML file, while the fourth preexisting feature loads an XSL document.

The fifth preexisting feature is a service call to an "XSL Transform" service. The feature assigns the XML catalog and XSL document service outputs from the third and fourth features, as the inputs to this service call. This service builds a new XML document that contains specific extracted data from the input catalog. Some of the data is transformed from attributes to entities and vise versa.

The sixth preexisting feature is an Imported Page. This feature takes the name of a URL as input, and constructs a Page entity in the runtime model that contains the imported HTML content. This page content is imported at regeneration time, and made available to other features for reference purposes.

The seventh preexisting feature is a Table. This feature takes a reference to a named entity in the imported page, and builds an HTML table. In addition, the feature assigns the service output from another service in the runtime model to be the body of the table. What happens is the XSL Transform service extracts data and presents it in a table format, and then another service filters the table data. The output from this service call (Feature 11) is what is placed in the table. As a result, the extracted and transformed cell phone catalog data is displayed on the imported page.

The eighth preexisting feature is a Parameter that contains a fixed list of entities that represent the headers of the table. This information may be created automatically by a different feature that serves as a more powerful alternative to the service call feature to the XSL Transform service. Such a feature is referred to as a data extraction feature. This feature would not only build a service call to the XSL Transform service, but also write the XSL data, and the schema of the service output parameter. Such a feature will be able to perform these actions because it is writing the XSL, so it knows what the structure of the XML output data from the service will be. In this case, the structure of the output data is the table header names that are manually encoded in the parameter feature.

The ninth and tenth preexisting features are UI controls that construct entities in the imported page. Specifically, they are the "Show Phones" button, and the "Select Manufacturer:" label.

The eleventh preexisting feature is a Service Call to a "Filter XML Table Data" service. The service call is named Select Phones. This service filters an XML table using a field list and a test value. The feature assigns the output from the XSL Transform service as input to the filter service. In addition, the feature assigns the value from the filterfield Selection Control (feature 14) as the test value used to find cell phones for a specific brand.

The twelfth preexisting feature is a Function that calls the select phones action (feature 11), and the cell phone data page action (feature 6). The intent of this function is group the two actions so that they can be called in sequence when a user presses the Show Phones button.

The thirteenth preexisting feature is a Fixed Text block that gets its value from the dsml:cn service output generated by the Get User Profile Data service. Depending upon the user profile, this text field updates to show the user's name.

The fourteenth preexisting feature is a Selection Control. This feature builds a control in the imported page that displays the list of phone brands that are extracted from the XML phone catalog. The selected item in this list is used by the Select Phones service call (feature 11).

The fifteenth and sixteenth preexisting features are a Service Call and a Parameter, respectively. The service call is to the XSL Transform service. This feature assigns the XML phone catalog as input, along with a block of XSL supplied in the showBrands parameter. The service call generates the list of phone brands in its service output. This output data is referenced by the filterfield Selection control in order to present the user with a list of phones to filter.

New Features

To enable the column of buttons and the display resulting from the selection of one of the Detail buttons 702, one or more embodiments of the invention provide for the creation/selection of several features through various steps.

1. Referring to FIG. 8, the first step, as described above, is to open cellcatalog template 800 in the template author application. In the template author application, the user is presented with a set of templates 804 that are stored in the LDAP directory, as well as templates 806 stored in files (.tpl).

2. Referring to FIG. 9, upon selecting preview button 902, the regenerated runtime model is displayed in display 700. The regenerated runtime model displayed in FIG. 9 illustrates what will be displayed by the resulting running WSA. Note, the user can select a phone brand from the drop down list 710, and press the Show Phones button 708 in the Preview pane to filter the phone list.

Figure 10:
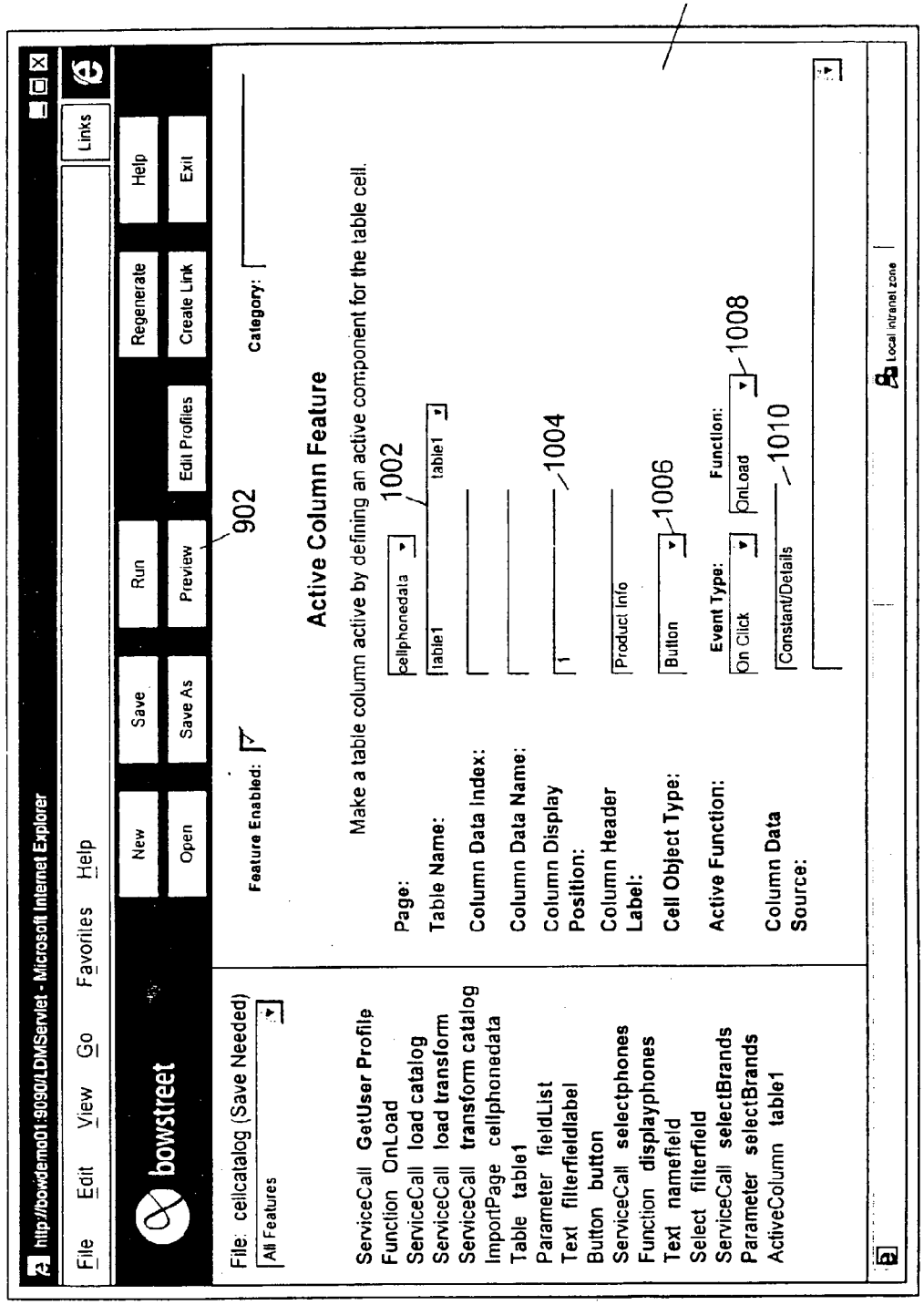
FIG. 10 illustrates the Active Column feature UI template in accordance with one or more embodiments of the invention.

3. The next step is to add an Active Column feature as the first column of the otherwise static table. In one or more embodiments, the active column feature is created by selecting Active Column from a feature palette. FIG. 10 illustrates the Active Column feature UT template 1000 once it is opened. The user then specifies values for various settings. For example, as illustrated in display 1000, the setting may include the following: the column is going into table 1 at table name setting 1002; the column position is identified as column 1 at column display position setting 1004; the control type (button, checkbox, etc) is set as a button at setting 1006; the action upon depressing the button is "OnLoad" in setting 1008, and the button name "Details" in setting 1010.

4. After completing the Active Column feature, the results may be previewed by selecting preview button 902. FIG. 7A illustrates the resulting display including new column 712. However, selection (by pressing) of the Details button doesn't do anything yet, other than execute the Onload action again. Note how the new feature 714 appears in the feature list.

Figure 11:
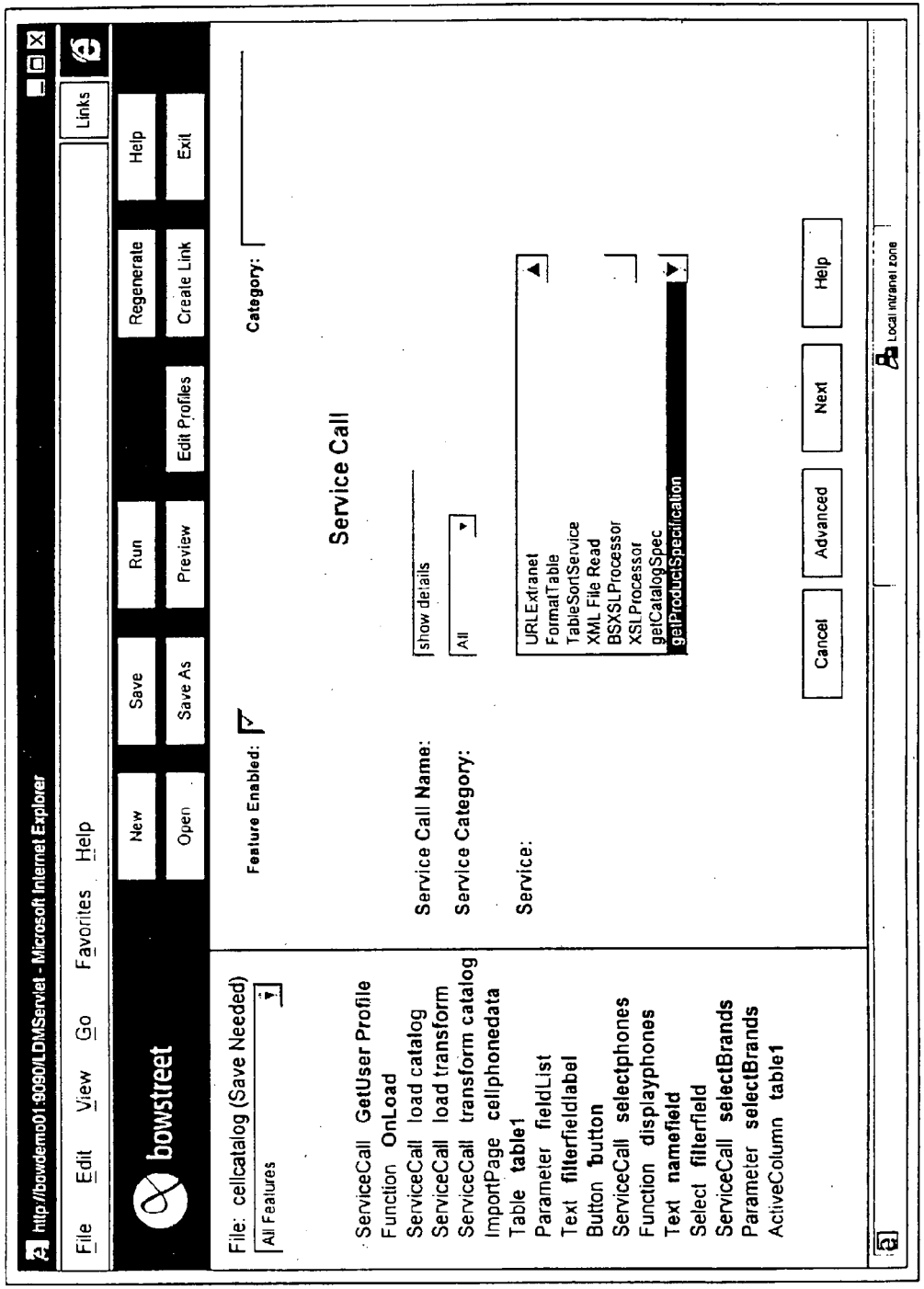
FIG. 11 illustrates the creation of a service in accordance with one or more embodiments of the invention.
Figure 12:
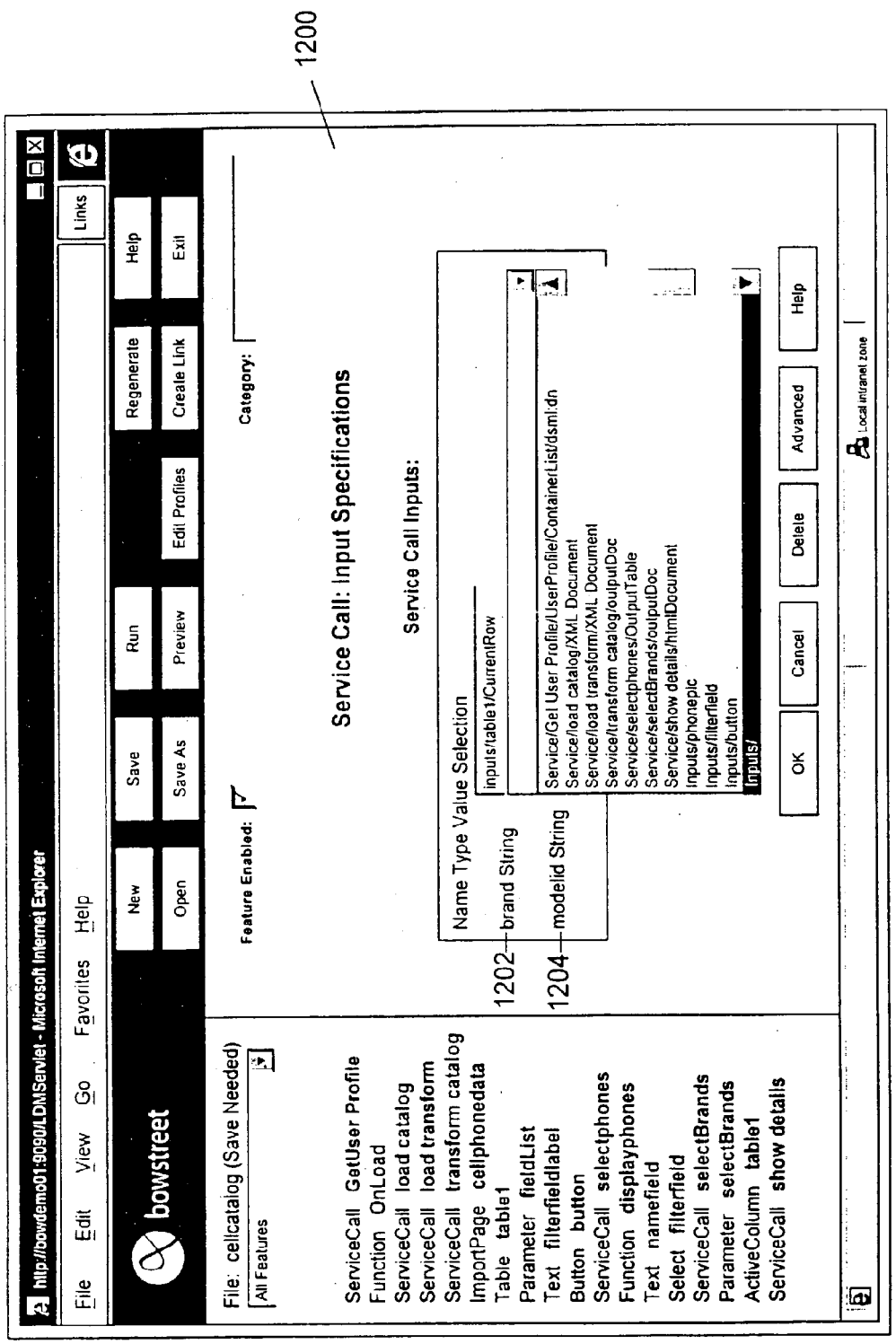
FIG. 12 illustrates the next page of the feature UI template for specifying a service's inputs in accordance with one or more embodiments of the invention.

5. The next step is to create a Service Call feature to a service in the web services directory called getProductSpecification as illustrated in FIG. 11. Note, the getProductSpecification service is a template-based service. The service call is named with a local name that has meaning in the context of the current runtime model. FIG. 12 illustrates the next page of the feature UI template for specifying the service's inputs. At this point, the feature looks up the service's input schema and builds a form like UI for specifying either constant values, or references to service outputs and parameters in the runtime model.

6. On service input specifications page 1200, the user is asked to supply two string values to this service. One is a phone brand name 1202, the other is a phone model name 1204. The user can specify constant values, but rather than specify constants, the inputs may be obtained by referring to the brand and model data values in the current row of the table. The user can select these references because the table feature provided access to these referenceable entities. Using this reference mechanism means that depending upon the row that is selected in the table, row specific values are fed into the service call.

Figure 13:
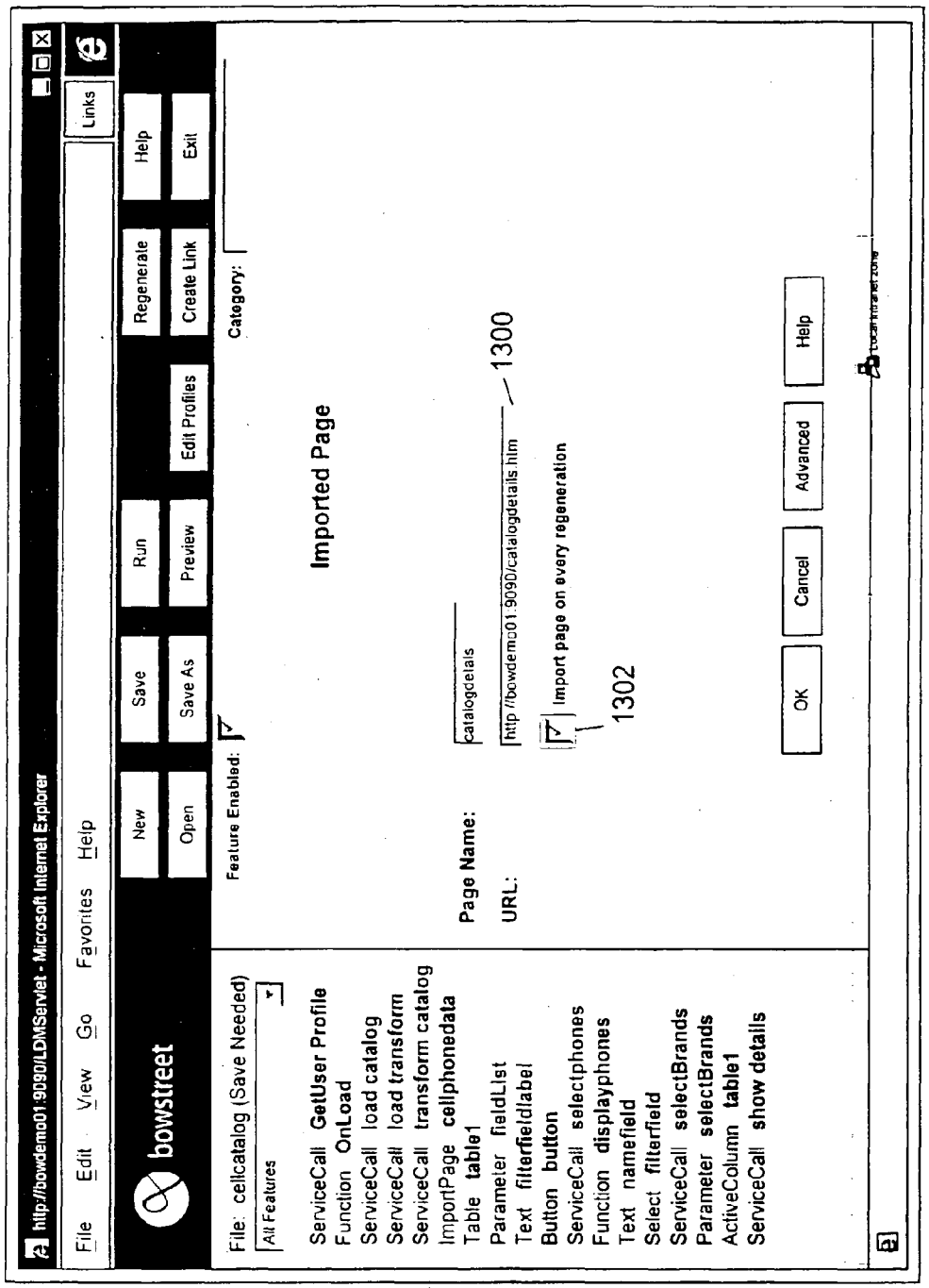
FIG. 13 illustrates the creation of an imported page feature in accordance with one or more embodiments of the invention.

7. After creating the Service Call to get product specification data, an imported page feature that can display the results is needed. FIG. 13 illustrates the creation of an imported page feature wherein the user supplies URL 1300 to an HTML page that contains formatting information and background color, etc. The user may also determine (by placing a checkmark in check box 1302) whether the system will re-import the page content upon regeneration in order to incorporate any changes that might have been made to the HTML file.

Figure 14:
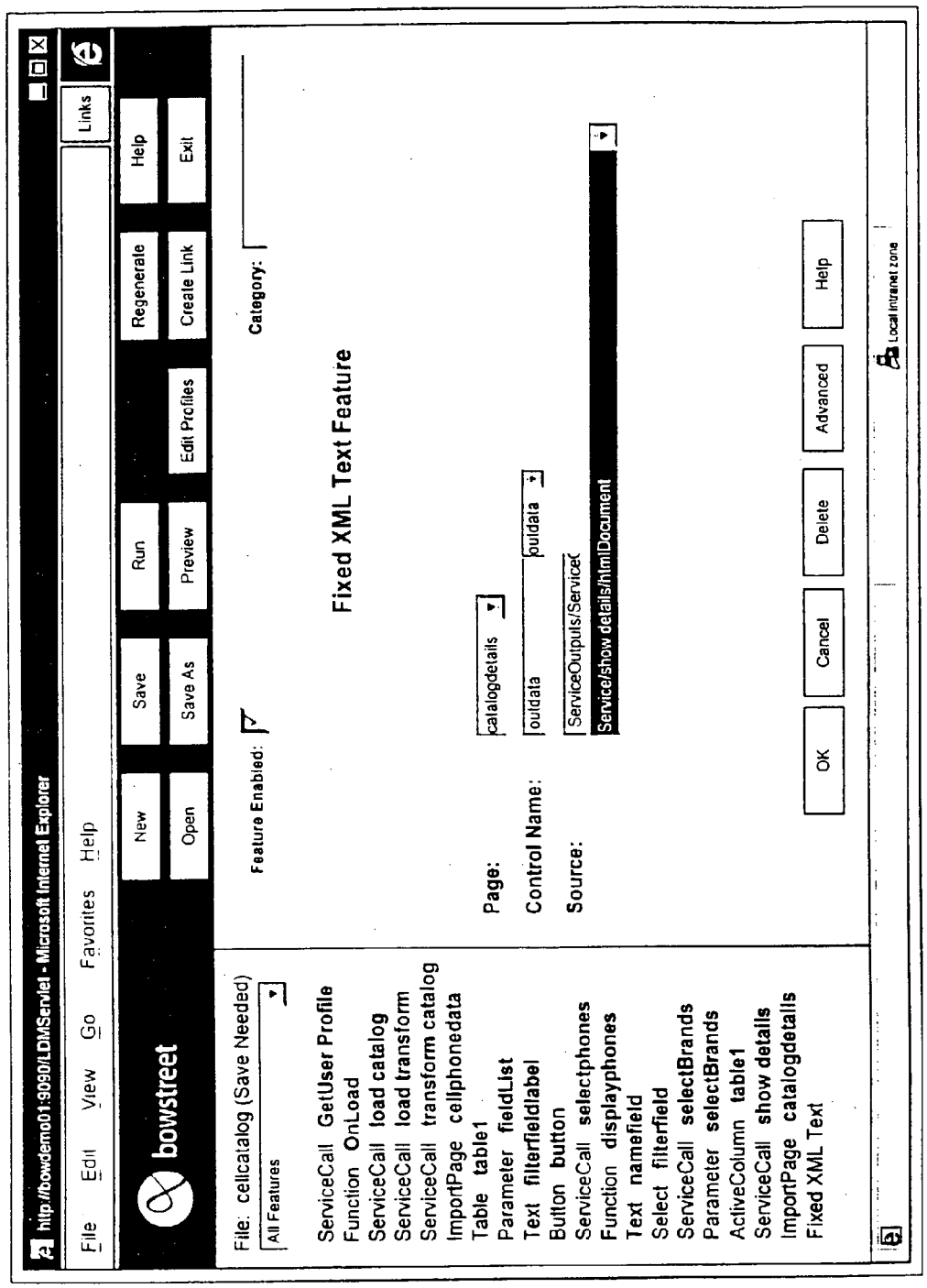
FIG. 14 illustrates the UI for a Fixed XML Text Feature in accordance with one or more embodiments of the invention.

8. The next step is to create a feature that will display the XML data output from the get product specification service, on a catalog details output page. In one or more embodiments, a Fixed XML Text feature may be utilized. FIG. 14 illustrates the UI for the Fixed XML Text Feature. For the feature's inputs, the user may select a named placeholder on the page as a locator, and specify the service output from the show details service call. In one or more embodiments (including the example as demonstrated), the output from this feature is a block of XML data that is formatted according to HTML.

Figure 15:
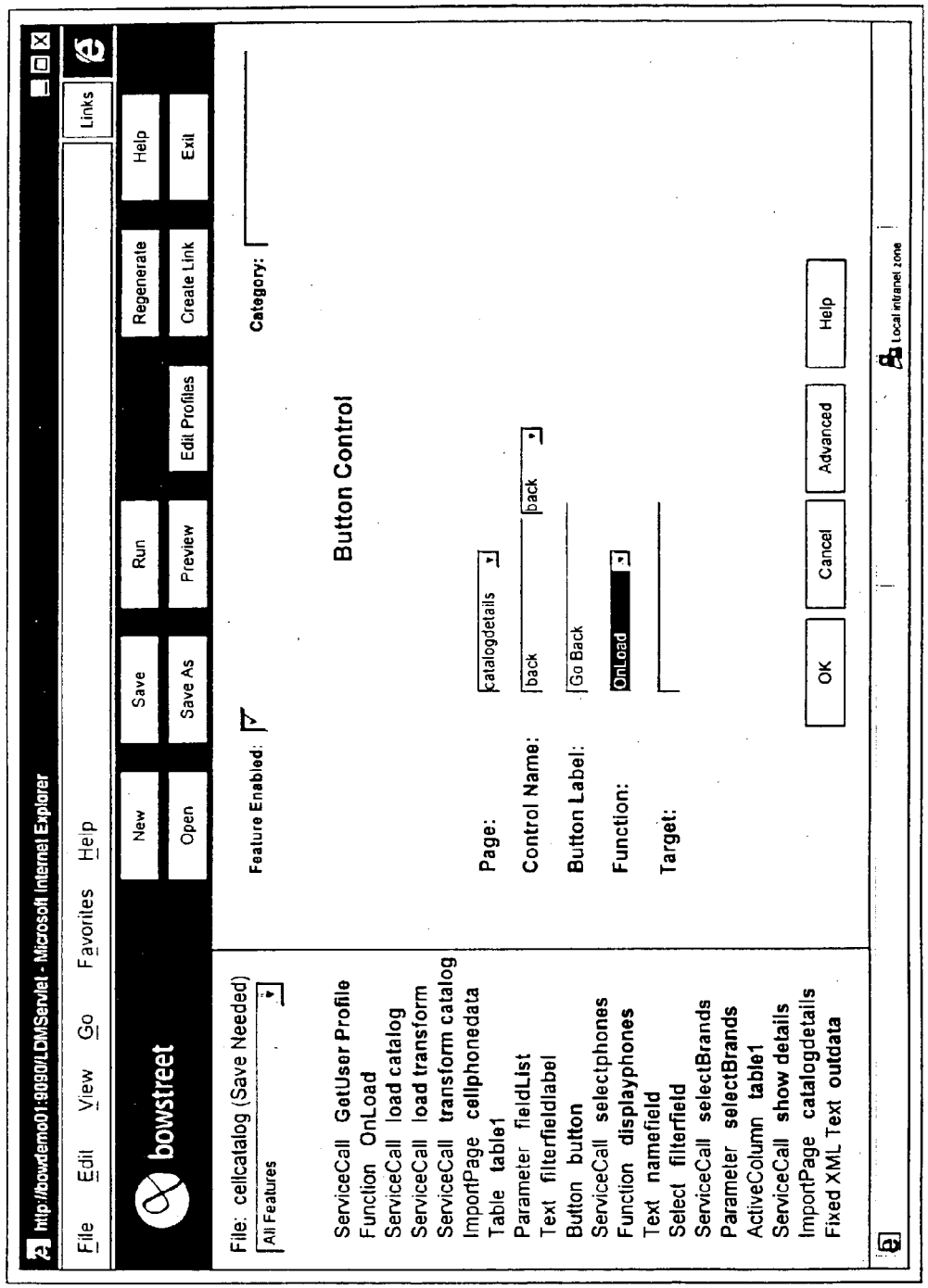
FIG. 15 illustrates the UI for a Button feature called "Go Back" in accordance with one or more embodiments of the invention.

9. The catalog details page needs a button that returns the user to the cell phone data page. Accordingly, a function feature is added that calls this page action and then bind the function action to a button feature, or, for simplicity at the expense of performance, a simple call to the Onload action when the button is pressed may be utilized. FIG. 15 illustrates the UI for a Button feature called "Go Back" that is attached to the place holder called back in the catalog details page.

Figure 16:
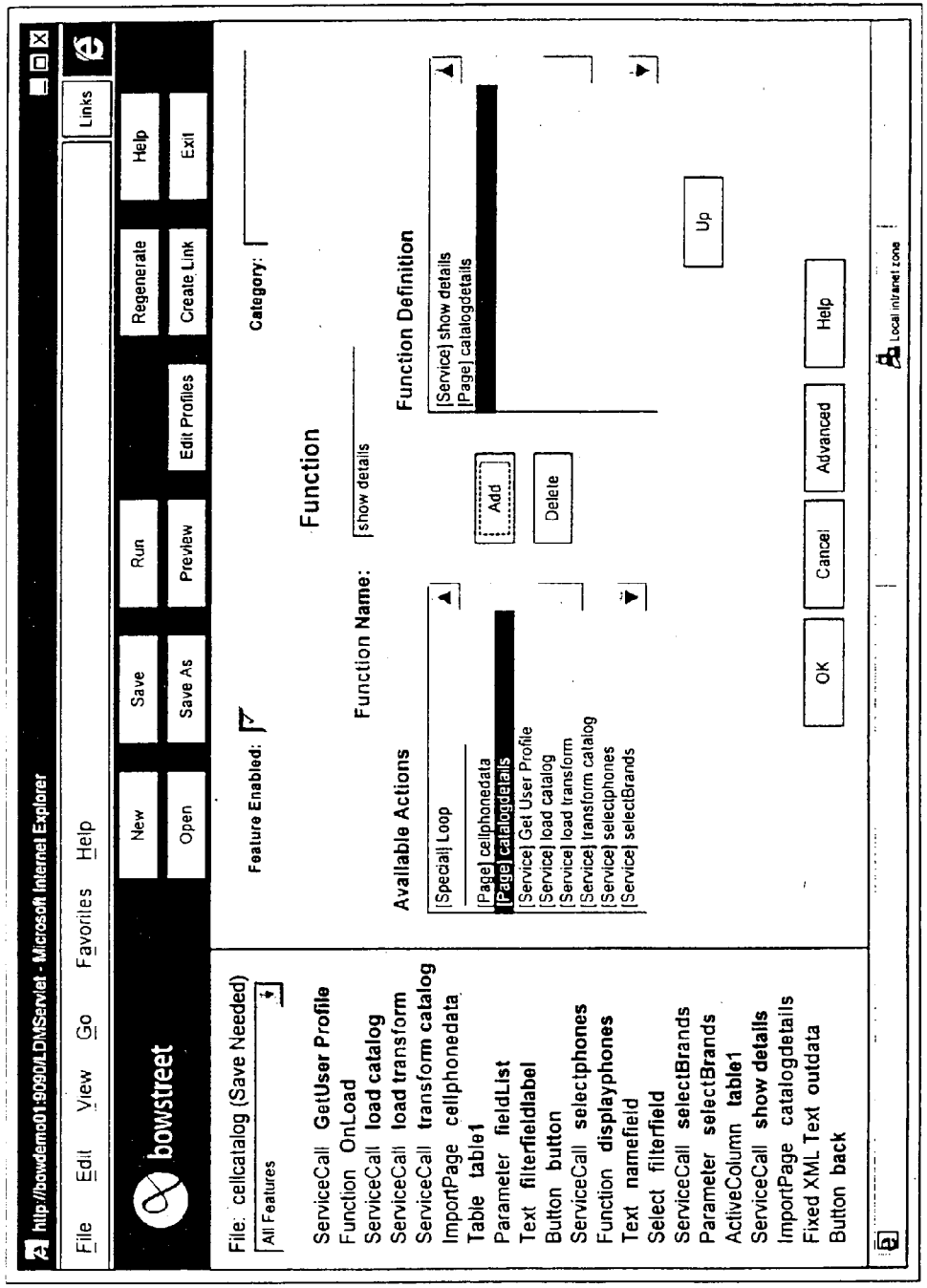
FIG. 16 illustrates the UI for adding a Function feature in accordance with one or more embodiments of the invention.

10. FIG. 16 illustrates the UI for the next step of adding a Function feature called Show Details. This function groups the call to the show details service call, with the call to the catalog details page action.

Figure 17:
FIG. 17 illustrates the Active Column Feature of FIG. 10 where a the function is being modified from OnLoad to Show Details in accordance with one or more embodiments of the invention.

11. Next, the Active Column Feature must be modified to change the selected Function from OnLoad to Show Details as illustrated in FIG. 17.

12 This completes the feature creation portion of the example. Preview command 902 may be selected to view the application. When one of the Details buttons is pressed, the output is product specification page 704 that contains data relevant to the selected row in the data table.

Thus, a method and apparatus for creating network services is described in conjunction with one or more specific embodiments. The invention is defined by the claims and their full scope of equivalents.

We claim:

1. A system for creating an XML runtime model comprising:
   an XML runtime model configured to define a context in which at least one web service is executed, the XML runtime model supported, at least in part, by a web services architecture including a web services directory database and a web services engine processor, and stored in a memory, the web services engine processor configured to execute the at least one web service;
   a template comprised of one or more features; and
   one or more of said features configured to automatically generate one or more entities in said XML runtime model at runtime in response to an automated iterative input process, whereby input, comprising said XML runtime model, is automatically obtained by each of said features in said template to automatically generate said one or more entities as each of said features is executed by said system.

2. The system of claim 1 wherein one or more of said features is configured to modify an entity in said XML runtime model.

3. The system of claim 1 wherein said XML runtime model may be utilized to construct a network service.

4. The system of claim 1 wherein said template is in XML.

5. The system of claim 1 wherein one or more of said features utilize an XML runtime model as input.

6. The system of claim 1 wherein one or more of said features are configured to obtain input from a user.

7. The system of claim 1 wherein each of said one or more features is executed in an order that said features are listed in a feature list.

8. The system of claim 1 wherein said input to a feature is a reference to an entity in said XML runtime model.

9. The system of claim 1 wherein one or more of said features is comprised of a feature service and a feature user interface.

10. The system of claim 1 wherein said XML runtime model represents XML-based messages.

11. The system of claim 1 wherein said template is an XML runtime model.

* * * * *